United States Patent [19]
Lee et al.

[11] Patent Number: 5,983,015
[45] Date of Patent: Nov. 9, 1999

[54] LATCH-FREE SEQUENCE GENERATION FOR HIGH CONCURRENCY SYSTEMS

[75] Inventors: J. William Lee, Foster City; William H. Bridge, Jr., Alameda, both of Calif.

[73] Assignee: Oracle Corporation, Redwood Shores, Calif.

[21] Appl. No.: 08/962,534

[22] Filed: Oct. 31, 1997

[51] Int. Cl.⁶ .................................................. G06F 9/46
[52] U.S. Cl. ............................................................ 395/677
[58] Field of Search ................................... 395/670, 676, 395/677, 678

[56] References Cited

U.S. PATENT DOCUMENTS

| | | | |
|---|---|---|---|
| 4,408,273 | 10/1983 | Plow | 707/202 |
| 4,435,766 | 3/1984 | Haber et al. | 395/726 |
| 4,757,442 | 7/1988 | Sakata | 395/182.09 |
| 5,398,331 | 3/1995 | Huang et al. | 395/182.1 |
| 5,625,829 | 4/1997 | Gephardt et al. | 395/284 |
| 5,784,623 | 7/1998 | Srinvasan | 395/726 |

*Primary Examiner*—David Y. Eng
*Attorney, Agent, or Firm*—McDermott, Will & Emery

[57] ABSTRACT

A method and apparatus for reading a software counter in a computer system that contains a plurality of processes each having access to the software counter is provided. The software counter includes a wrap portion and a base portion that cannot both be accessed in an atomic operation. The method includes the steps of reading a first value. The first value being one of the wrap or base portions. Reading a second value. The second value being the other of the wrap or base portion. Determining whether the first value might be changed during a time period that elapsed between reading the first value and reading the second value. If the first value might be changed during the time period, then obtaining a latch that covers at least the wrap portion. After obtaining the latch, reading the wrap and base portion and releasing the latch.

44 Claims, 15 Drawing Sheets

Prior Art

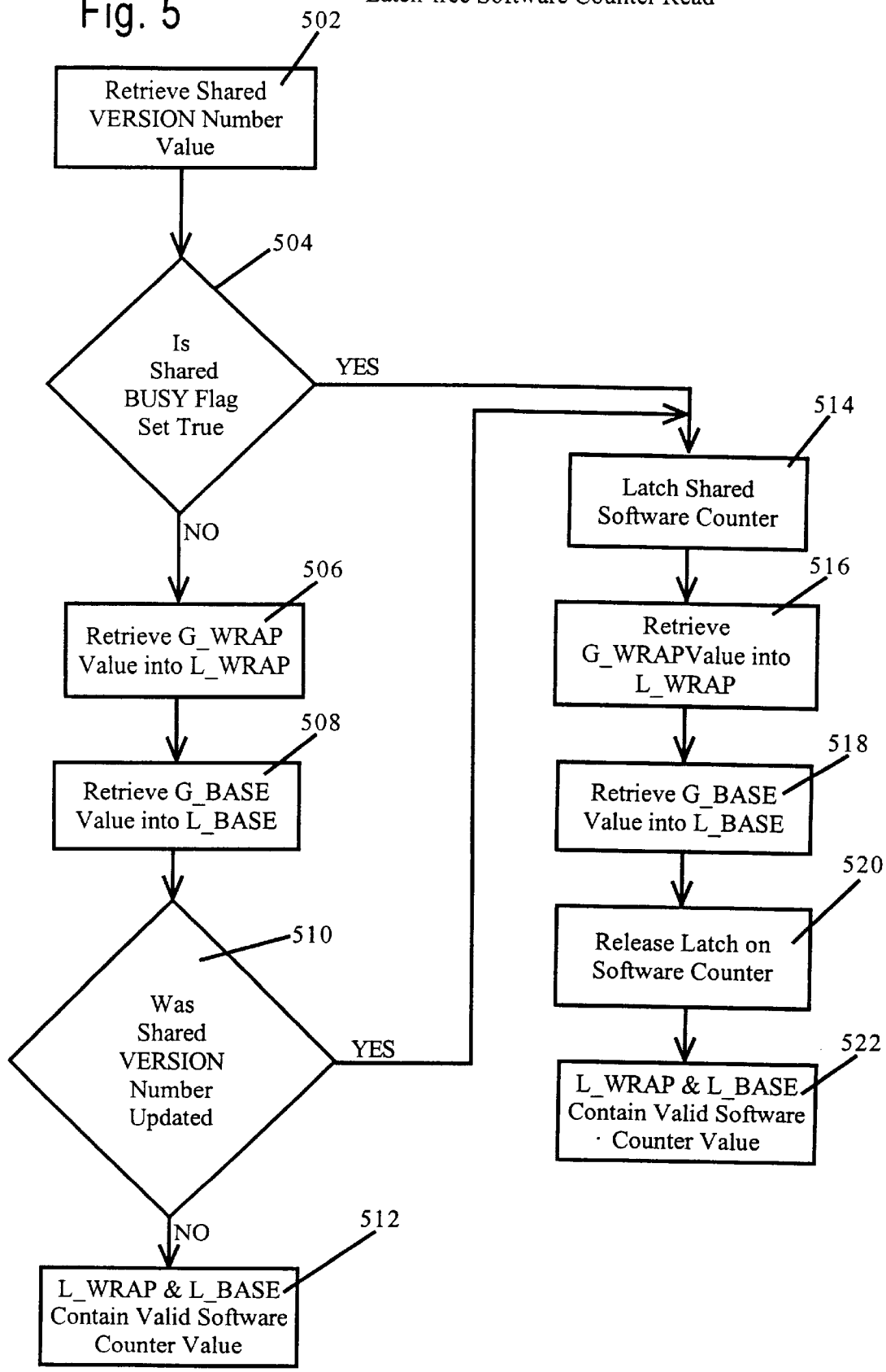
Fig. 5 — Latch-free Software Counter Read

Latched Software Counter Increment

Latched Software Counter Ajustment

LATCH-FREE SEQUENCE GENERATION FOR HIGH CONCURRENCY SYSTEMS

FIELD OF THE INVENTION

The present invention relates to generating sequence numbers and, more specifically, to techniques for generating sequence numbers within high concurrency systems.

BACKGROUND OF THE INVENTION

In most computer systems, it is desirable to maximize the processing power and throughput of the system hardware. To achieve a higher throughput, a computer system will typically increase the utilization of the hardware by executing multiple processes concurrently. Executing multiple processes concurrently enables a system to enhance its performance by increasing the utilization of the CPU and other peripheral devices.

In a concurrent processing environment, each process is simply an executing program that contains its own program counter, registers and variables. Although concurrent processes often share a disk or common memory area, each process may execute independent of the other processes. Because each process is able to execute independently, events associated with and transactions executed by the concurrent processes can complete asynchronously with respect to one another.

It is often desirable for these otherwise asynchronous events and transactions to be ordered by time of occurrence. For example, tracking the ordering of transactions that perform changes to a database is critical to maintaining the stability and consistency of the database. If data from the database needs to be reconstructed as of a designated time, it is critical to be able to distinguish between changes made by transactions that completed before the designated time and changes made by those transactions that completed after the designated time. Therefore, to maintain consistency, it is extremely important to know when each transaction completed relative to other completed transactions.

One method of ordering events in a multiprocessing system is by assigning a logical time-stamp to each event. For example, as transactions complete in a database system, a logical time-stamp may be attached to each transaction. The logical time-stamp assigned to the completion of each transaction is used by the database system to represent a logical time ordering of when the events occurred.

To effectively assign time-stamps, a mechanism for producing ever-increasing sequence numbers must be provided. A typical method for providing ever-increasing sequence number is to provide a software counter that can be accessed and incremented by each process. Thus, whenever an event occurs for a particular process, the process may increment the software counter, read the counter to obtain a specific sequence number, and attach the sequence number to the current event.

Since logical time-stamps provide only a relative ordering of events, it is not necessary that each sequence number supplied by software counter increment uniformly, but only that the current value provided by the software counter be greater than any previous value provided by the software counter. For example, if events are provided time stamps in the sequence one (1), two (2), five (5), and nine (9), it is still possible to determine the relative order in which each event occurred.

Because the logical time-stamps are relative to one another, it is critical to provide a software counter that will provide ever-increasing numbers throughout the lifetime of the concurrent processing system in which it is used. Therefore, it is often desirable and even necessary, to provide a software counter with a greater range than that provided by the bit-size of a single machine word.

For example, as depicted in FIG. 1, a software counter composed of a single eight-bit machine word can provide only 256 (0 through 255) distinct sequence number values. Once the software counter reaches its maximum value, it will roll over to zero the next time it is incremented. A rollover of the software counter will disrupt the logical time-stamp ordering as the event attached to time-stamp 110 will incorrectly appear to have occurred before the events attached to time-stamps 102–108.

To enable the provision of ever-increasing sequence numbers during the life span of a system, a software counter composed of more than one machine word may be used. For example, as shown in FIG. 2, by dedicating one eight-bit machine word as the base 216 (low order bits) and another machine word as the wrap 202 (high order bits), a software counter can significantly increase its range of valid sequence values and, therefore, substantially increase its effective life span.

It should be noted that FIGS. 1 and 2 depict eight-bit machine words for illustrative purposes only. These examples can easily be extended for computers that employ larger bit machine words, including but not limited to the sixteen or thirty-two bit machines that are commonly in use today. For example, if a thirty-two bit machine is used, a sixty-four bit software counter can be formed by using two thirty-two machine words.

Although utilizing sequence numbers that are multiple machine words long can eliminate the sequence number rollover obstacle in most systems, it has the side effect of introducing yet another problem. Specifically, machine instructions operate on one word at a time. Therefore, a sequence number stored in a software counter that comprises multiple machine words cannot be read or modified in an atomic operation. This gives rise to the possibility that some event may occur between accessing one word of the software counter and accessing another word of the software counter. Consequently, a sequence value obtained by one process may have been corrupted by another process seeking to procure a sequence number from the same software counter at the same time.

For example, if the software counter is comprised of multiple machine words BASE (low order bits) and WRAP (high order bits), two separate read instructions will be required to obtain the complete value. If after reading WRAP, but before reading BASE, another process modifies the software counter, the read instruction will return an incorrect value. Therefore, a process cannot be guaranteed that the returned sequence number is valid.

One technique to guarantee that the sequence number read from a multiple-word software counter will not be corrupted by concurrent processes is to serialize access to the software counter using a latch. Specifically, a latch is established for the software counter. Before a process can access the software counter, the process must obtain the latch. If another process already has the latch, the process must wait until the previous process releases the latch. By obtaining the latch before accessing the software counter, a process ensures that no other concurrently executing process will be concurrently accessing the software counter.

Latching the software counter ensures that the returned sequence number is valid and has not been corrupted by another process. However obtaining a latch can be particularly expensive if the latch is fault-tolerant as the system must retain enough information to be capable of automatically releasing the latch if the process holding the latch dies. Furthermore, allowing only one process at any given time access to a shared resource, such as the software counter, can create a significant bottleneck and, thus, significantly degrade the performance of a high concurrency system.

For example, if process A latches and acquires the shared resource, process B and process C must wait until the latch is released before they can acquire and access to the shared resource. This has the effect of serializing a concurrent system as processes are prohibited from executing until the shared resource is released and they are allowed to latch and access the shared resource themselves.

Additionally, further degradation of a concurrent system occurs when after acquiring a latch on the shared resource, process A is swapped out of memory to allow another process to execute. In this situation, all other processes requiring access to the sequence number must wait until the swapped-out process is rescheduled to execute and releases its latch on the shared sequence generator.

Requiring each process to wait until a latch can be obtained in order to read or modify a software counter has been proven to seriously degrade a database system's performance. Therefore, it is highly desirable for high concurrency systems to minimize the amount of time that a software counter is latched.

SUMMARY OF THE INVENTION

A method and apparatus for reading a software counter in a computer system that contains a plurality of processes each having access to the software counter is provided. The software counter includes a wrap portion and a base portion that cannot both be accessed in an atomic operation. The method includes the steps of reading a first value. The first value being one of the wrap or base portions. Reading a second value. The second value being the other of the wrap or base portion. Determining whether the first value was changed during a time period that elapsed between reading the first value and reading the second value. If the first value was changed during the time period, then obtaining a latch that covers at least the wrap portion. After obtaining the latch, reading the wrap and base portion and releasing the latch.

According to one aspect of the invention, the step of reading the first value is performed by reading the wrap portion and the step of reading the second value is performed by reading the base portion.

In another aspect of the invention, a method and apparatus for increasing a sequence number stored in a software counter of a computer system that contains a plurality of processes having access to the software counter is provided. The software counter includes a wrap portion and a base portion that cannot both be accessed in an atomic operation. The method includes the steps of determining whether an increase to the software counter requires a change to the wrap portion. If the increase to the software counter requires a change to said wrap portion, then obtaining a latch that covers at least the wrap portion. Thereafter updating the software counter after obtaining the latch. If the increase to the software counter does not require a change to the wrap portion, then reading a first base value from the base portion and performing an atomic operation. The atomic operation includes the steps of reading a second base value from the base portion, comparing the first base value with the second base value, and if the first base value is equal to the second base value, then storing a third base value which is greater than the first base value, into the base portion.

According to one aspect of the invention, if the first base value is not equal to the second base value, a latch that covers at least the wrap portion is obtained. The software counter is then updated after obtaining the latch.

In certain aspects of the invention, a target sequence number indicates a minimum value in which sequence number stored in the software counter must be set. The target sequence number includes a target base portion and a target wrap portion.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 is a flow diagram illustrating steps performed in a latch-free read of a software counter according to an embodiment of the invention;

DETAILED DESCRIPTION OF THE PREFERRED EMBODIMENT

A method and apparatus for latch-free sequence generation for high concurrency systems is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
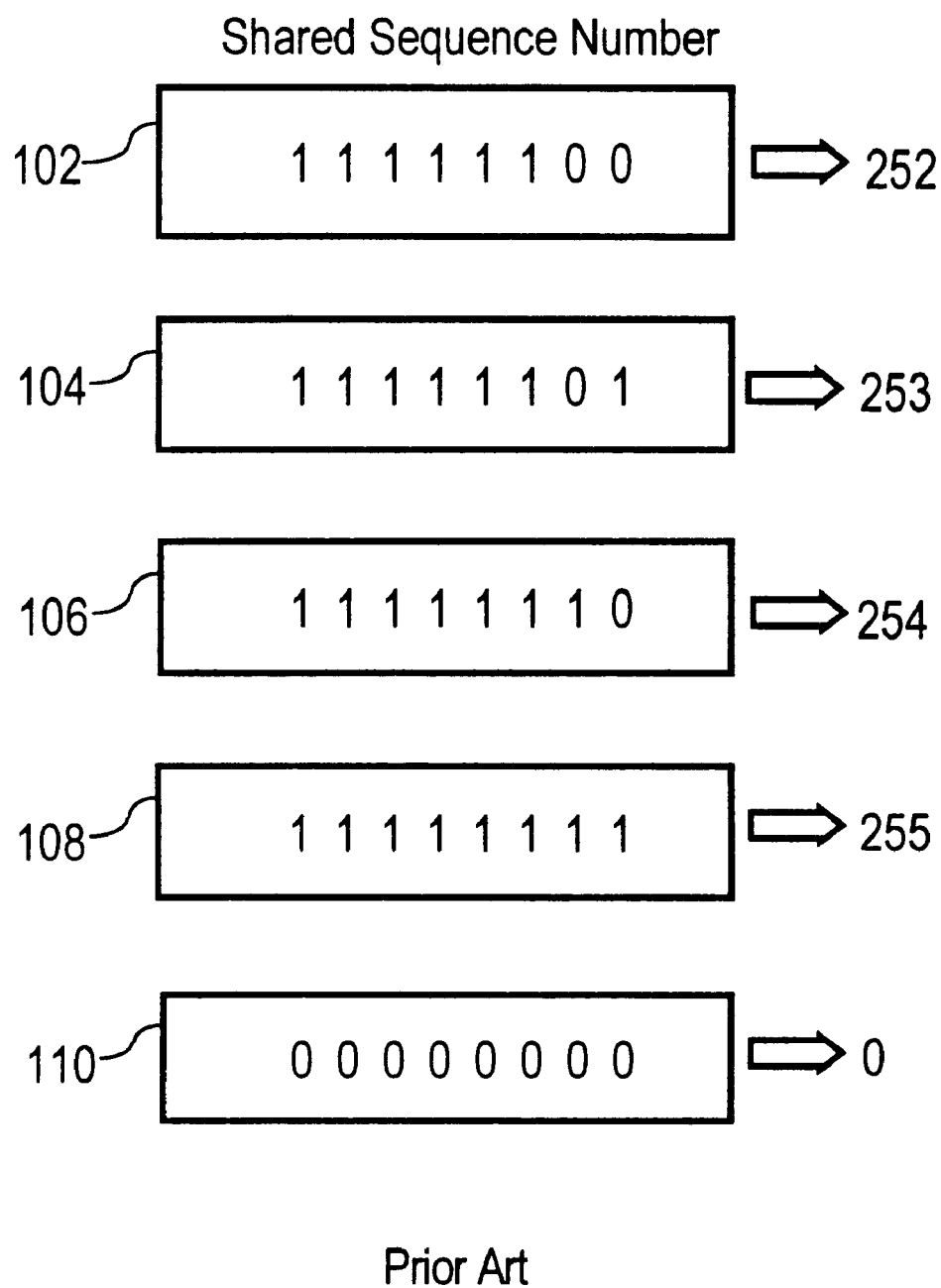
FIG. 1 is a block diagram that illustrates a software counter rollover problem.
Figure 2:
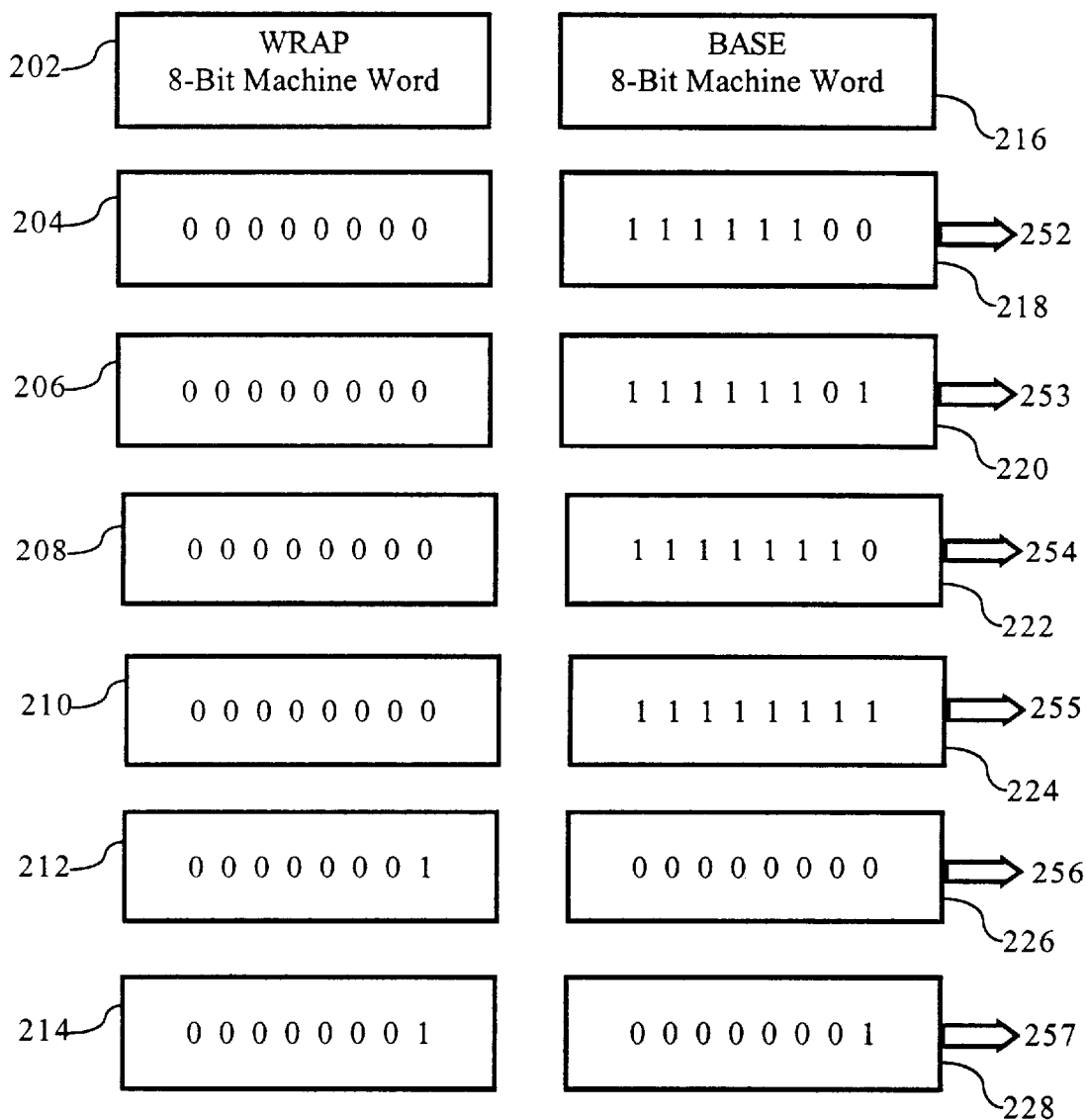
FIG. 2 is a block diagram of a multiple machine word sequence number.
Figure 3:
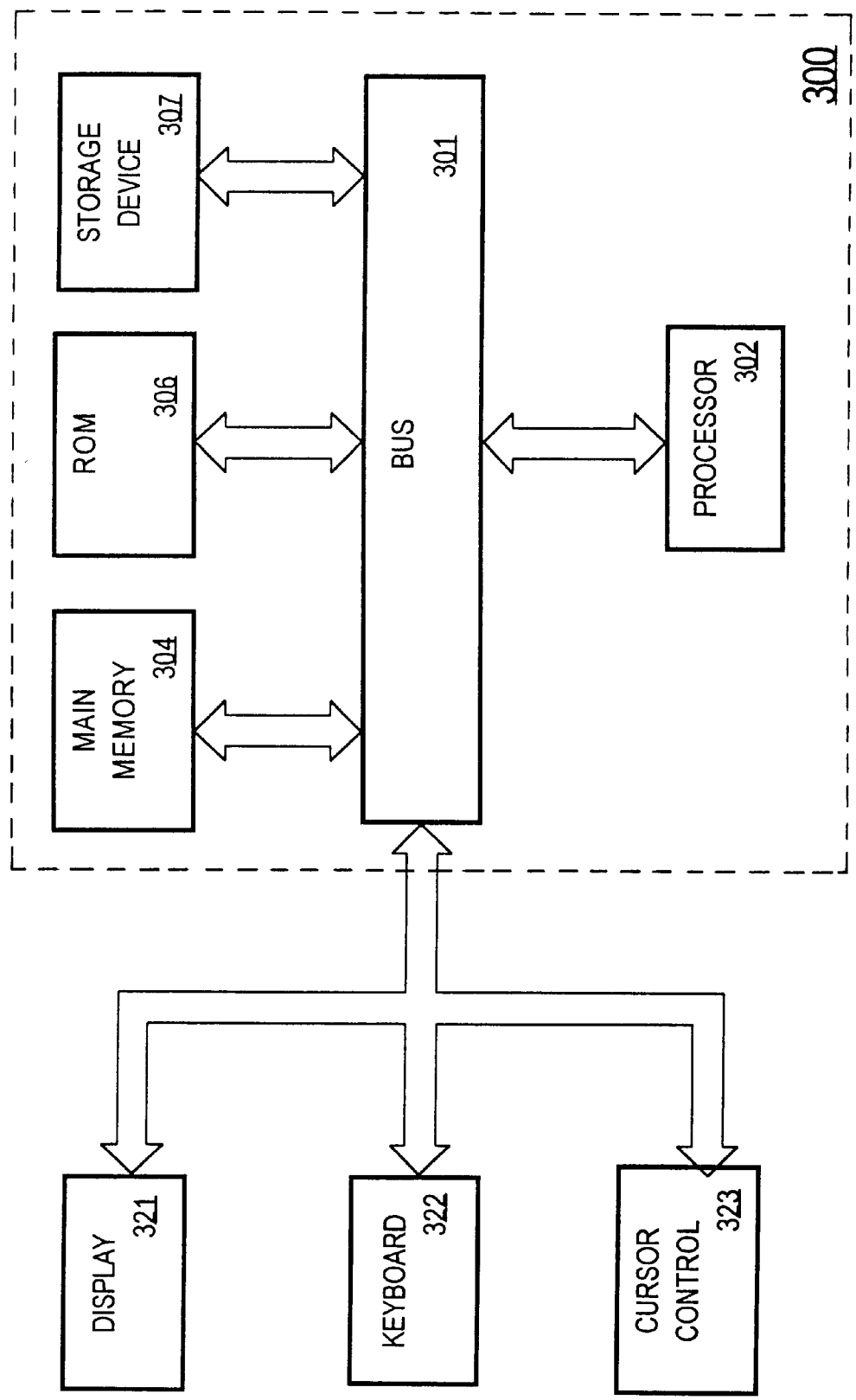
FIG. 3 is a block diagram illustrating a computer system on which an embodiment of the present invention may be implemented.

Referring to FIG. 3, it is a block diagram of a computer system 300 upon which an embodiment of the present invention can be implemented. Computer system 300 includes a bus 301 or other communication mechanism for communicating information, and a processor 302 coupled with bus 301 for processing information. Computer system 300 further comprises a random access memory (RAM) or other dynamic storage device 304 (referred to as main memory), coupled to bus 301 for storing information and instructions to be executed by processor 302. Main memory 304 also may be used for storing temporary variables or other intermediate information during execution of instructions by processor 302. Computer system 300 also comprises a read only memory (ROM) and/or other static storage device 306 coupled to bus 301 for storing static information and instructions for processor 302. Data storage device 307 is coupled to bus 301 for storing information and instructions.

A data storage device 307 such as a magnetic disk or optical disk and its corresponding disk drive can be coupled to computer system 300. Computer system 300 can also be coupled via bus 301 to a display device 321, such as a cathode ray tube (CRT), for displaying information to a computer user. Computer system 300 further includes a keyboard 322 and a cursor control 323, such as a mouse.

The present invention is related to the use of computer system 300 to perform latch-free sequence generation for high concurrency systems. According to one embodiment, latch-free sequence generation is performed by computer system 300 in response to processor 302 executing sequences of instructions contained in memory 304. Such instructions may be read into memory 304 from another computer-readable medium, such as data storage device 307. Execution of the sequences of instructions contained in memory 304 causes processor 302 to perform the process steps that will be described hereafter. In alternative embodiments, hard-wired circuitry may be used in place of or in combination with software instructions to implement the present invention. Thus, the present invention is not limited to any specific combination of hardware circuitry and software.

SEQUENCE GENERATION FOR HIGH CONCURRENCY SYSTEMS

As mentioned above, it is highly desirable to reduce serial access of shared data, such as a software counter, in high concurrency systems. Therefore, in order to increase the processing power and throughput of a database system, the present invention reduces the amount of time that a process will be required to latch a shared software counter in order to obtain a valid logical timestamp value.

According to the present invention, whenever a process requires a valid software counter value, it first attempts to retrieve or advance the software counter value without latching the shared software counter. This will succeed as long as no other process is updating the wrap concurrently. In the common case, no process updates the wrap because the wrap is only advanced when the base overflows. In the rare case when another process is updating the wrap value concurrently, the process falls back to obtain a latch. As explained below in the flow diagram descriptions, a process may perform three distinct procedures in order to retrieve a software counter value.

In a first procedure, a method is disclosed for reading the current software counter value. As outlined in section LATCH-FREE SOFTWARE COUNTER READ, a read is first attempted without latching the software counter. If it is determined that a latch is not required to read a valid software counter value, then the process is complete and serialization of access to the software counter is reduced, since no latch was obtained for the software counter. However, if it is determined that a latch is required to read a valid software counter value, then the read is performed after a latch is first obtained on the software counter.

In a second procedure, a method is disclosed for incrementing the software counter value. As outlined in section LATCH-FREE SOFTWARE COUNTER INCREMENT, the procedure returns a software counter value that is at least one greater than the current software counter value. The procedure first attempts to increment the software counter without latching the software counter. If a latch is not required to perform a valid increment of the software counter, then the process is complete and serialization of the database system is reduced because no latch was obtained. However, if a latch is required to validly increment the software counter, then as outlined in section LATCHED SOFTWARE COUNTER INCREMENT, the increment is performed after a latch is first obtained on the software counter.

In a third procedure, a method is disclosed in which an adjustment to the software counter value is performed. As outlined in section LATCH-FREE SOFTWARE COUNTER ADJUSTMENT, the adjustment procedure takes an input adjustment value as a parameter and advances the software counter value as necessary to ensure that the value of the software counter is at least as large as the input adjustment value. If it is necessary to advance the software counter based on the input adjustment value, the LATCH-FREE SOFTWARE COUNTER ADJUSTMENT procedure attempts to first adjust the software counter value without a latch. If a latch is not required to perform a valid adjustment of the software counter, then the process is complete and serialization of the database system is reduced because no latch of the software counter is required. However, if a latch is required to validly adjust the software counter, then as outlined in section LATCHED SOFTWARE COUNTER ADJUSTMENT, the adjustment is performed after a latch is first obtained on the software counter.

Figure 4:
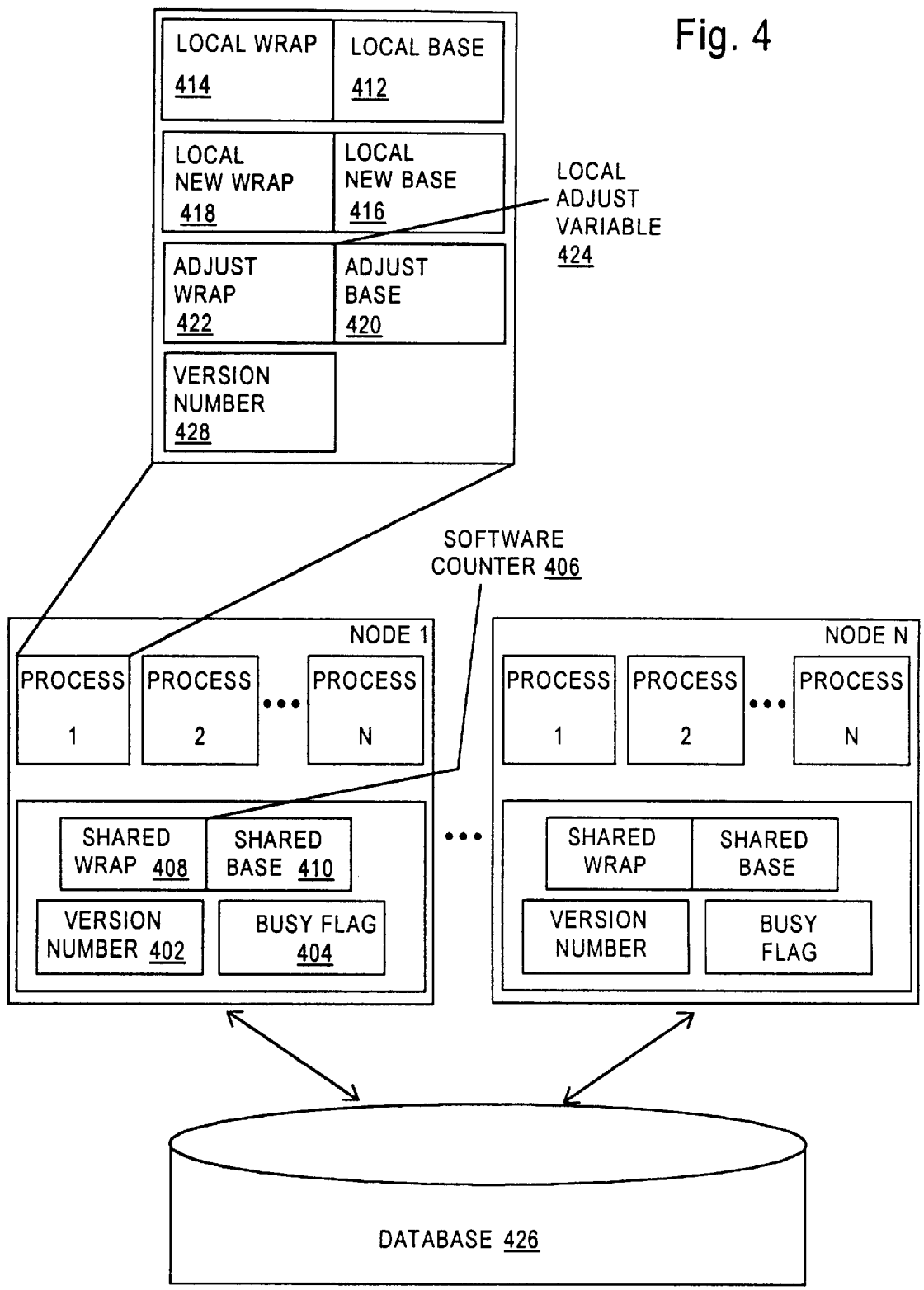
FIG. 4 is a block diagram of a typical computer system sharing a sequence number among multiple processes.

FIG. 4, represents a block diagram of a database system in which an embodiment of the present invention can be used to reduce the latching of a shared software counter in a high concurrency system. As depicted in FIG. 4, multiple processes having access to a shared database 426 are contained within one or more nodes. Each node maintains a shared data that is accessible by each process contained within the node. The shared data comprises of a software counter 406, a shared version number 402 and a shared busy flag 404.

Shared version number 402 and shared busy flag 404 represent access indicators that help determine whether the value being retrieved from software counter 406 is in fact valid. Software counter 406 is comprised of multiple machine words as depicted by shared base 410 and shared wrap 408. Therefore, a process must execute multiple instructions in order to retrieve the complete value of software counter 406. Also, because shared base 410 represents the base portion (low order bits) of software counter 406, the wrap portion (high order bits) represented by shared wrap 408 only increments whenever shared base 410 overflows.

In the present example, both shared base 410 and shared wrap 408 are shown as being comprised of single machine words, however, in an alternative embodiment, shared wrap 408 is comprised of multiple machine words.

As depicted in FIG. 4, each process uses local variables (local base 412, local wrap 414, local newbase 416, local newwrap 418 and local version number 428) during the retrieval of values from software counter 406. These local variables are used to store current software counter values and to help determine whether another process has modified the value of software counter 406 in between the time period of reading both shared base 410 and shared wrap 408 portions. By examining shared busy flag 404 and comparing previously obtained local version number 428 with shared version number 402, the processes determine if a valid software counter 406 value may be obtained without a latch.

In addition, in certain situations, a process may attempt to adjust software counter 406 to a specific value. In these cases, local adjust variable 424 represents an adjustment value which is comprised of adjust base 420 and adjust wrap 422.

LATCH-FREE SOFTWARE COUNTER READ

FIG. 5 is a flow diagram illustrating steps for latch-free reads of software counter 406 according to an embodiment of the invention. In general, a process attempts to perform a latch-free read by reading the value of shared wrap 408, then reading the value of shared base 410. The process then determines whether the value of shared wrap 408 was changed by another process during the time period that elapsed between reading the value of shared wrap 408 and the value of shared base 410. If the value of shared wrap 408 was not changed by another process during the time period that elapsed between reading the value of shared wrap 408 and the value of shared base 410, then the value retrieved from software counter 406 is considered valid. Otherwise, the value is considered invalid and the process attempts to read the software counter 406 again. During the second of subsequent attempts to read the software counter, the process may resort to obtaining a latch on the software counter to ensure that a valid value will be obtained.

According to one embodiment, a shared version number 402 and shared busy flag 404 are used to indicate whether another process is currently updating shared wrap 408. If shared version number 402 or shared busy flag 404 indicate that another process is currently updating shared wrap 408, then software counter 406 must be latched before a valid read of the software counter 406 can be performed.

Referring to FIG. 5, at step 502, shared version number 402 is retrieved into a local variable for use in determining whether another process updated shared wrap 408 before the complete value of software counter 406 was retrieved. At step 504, shared busy flag 404 is tested to determine whether another process is presently attempting to update shared wrap 408 while concurrently accessing software counter 406. If another process is presently attempting to update shared wrap 408, then control proceeds to step 514.

Otherwise, if another process is not presently attempting to update shared wrap 408, at step 506, shared wrap 408 is retrieved into local wrap 414 and at step 508, shared base 410 is retrieved into local base 412.

At step 510, shared version number 402 is tested to determine whether another process could have updated shared wrap 408 while concurrently accessing software counter 406. If another process updated shared version number 402, indicating that the other process could be concurrently accessing software counter 406, then control proceeds to step 514. Otherwise, if no other process could have updated shared wrap 408 while concurrently accessing software counter 406, then at step 512 local base 412 and local wrap 414 contain values that represent a valid read of software counter 406.

At step 514, software counter 406 is latched to ensure that no other process updates software counter 406 while it is being read. At step 516, shared wrap 408 is retrieved into local wrap 414. At step 518, shared base 410 is retrieved into local base 412.

At step 520, the latch on software counter 406 is released to allow other processes access to software counter 406. At step 522, local base 412 and local wrap 414 contain values that represent a valid read of software counter 406.

LATCH-FREE SOFTWARE COUNTER INCREMENT

Figure 6A:
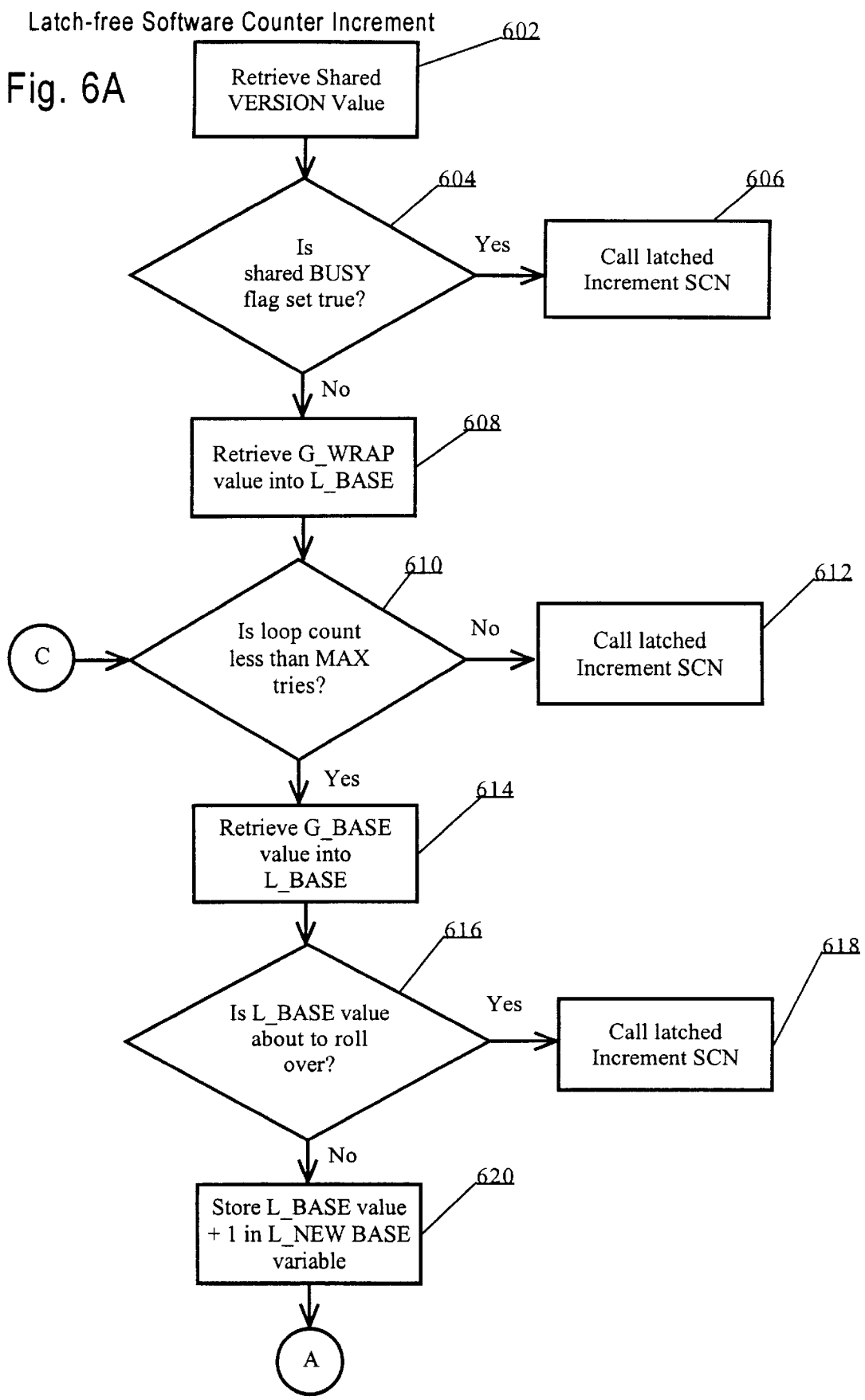
FIGS. 6A & 6B are flow diagrams illustrating steps performed in a latch-free increment of a software counter according to an embodiment of the invention.
Figure 6B:
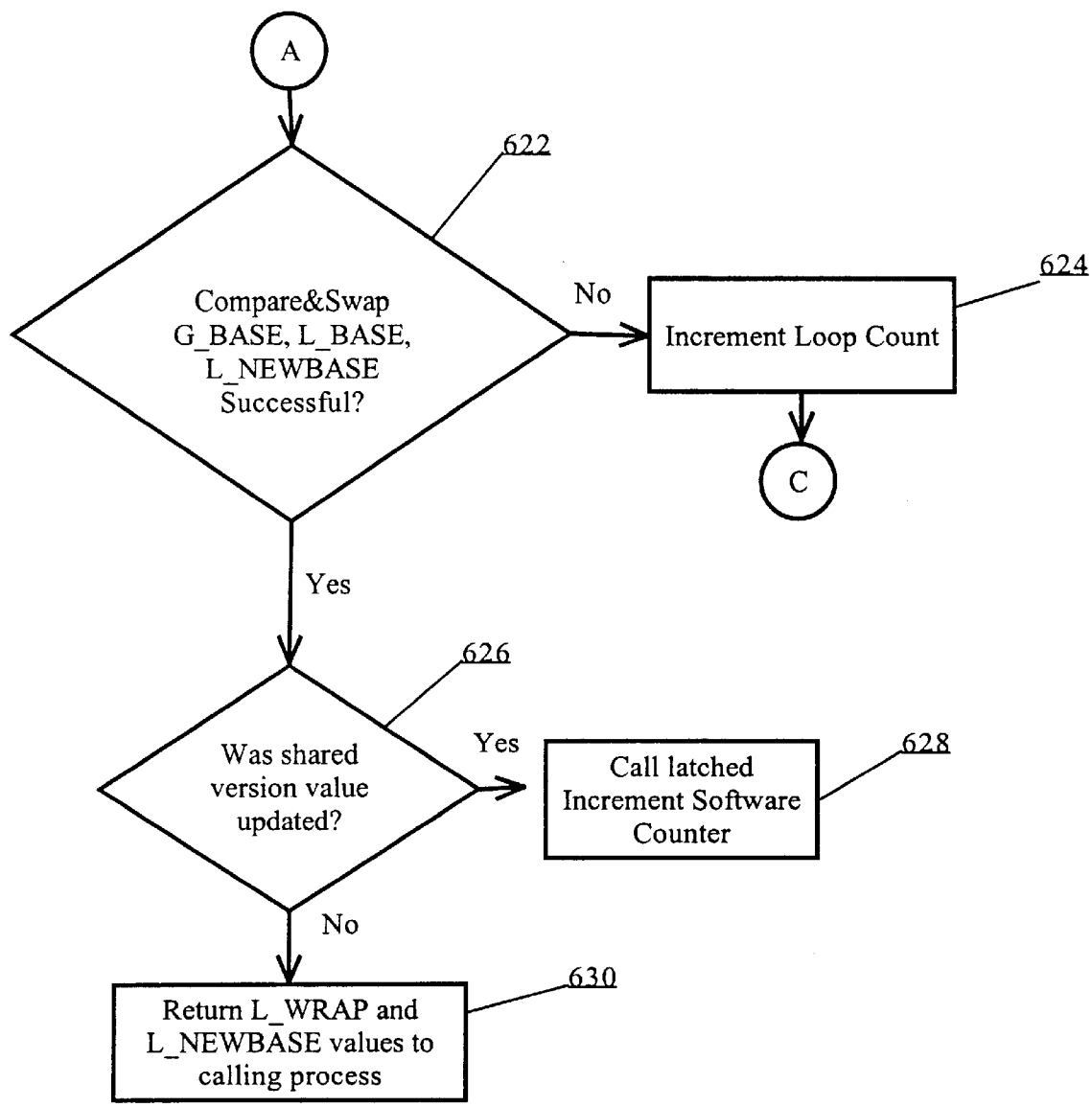

FIGS. 6A and 6B are a flow diagram which illustrate a latch-free increment technique for incrementing software counter 406 in order to obtain a valid incremented timestamp value according to one embodiment of the present invention. As depicted in FIGS. 6A and 6B, a process attempts to perform a latch-free increment by reading the value of shared wrap 408, and then incrementing the value of shared base 410. After incrementing the shared base 410, the process determines whether the value of shared wrap 408 could have been changed by another process during the time period that elapsed between reading the value of shared wrap 408 and incrementing the value of shared base 410. If the value of shared wrap 408 could not have been changed by another process during the time period that elapsed between reading the value of shared wrap 408 and incrementing the value of shared base 410, then the incremented value retrieved from software counter 406 is considered valid. Otherwise, the value is considered invalid and one or more subsequent attempts to increment the software counter 406 are performed. To ensure success, the process may obtain a latch before a subsequent attempt to increment the software counter.

The latch-free increment technique illustrated in FIGS. 6A and 6B assumes the existence of a "compare-and-swap" operation. A compare-and-swap operation takes three parameters: a pointer to a shared variable (first machine word), the value to compare with (second machine word) and the value to set (third machine word). The compare-and-swap instruction is an atomic operation in which the value of a first machine word is compared to the value of a second machine word and if they are equal, sets the value of the first machine word equal to the value of a third machine word. Such operations are supported by numerous existing computer platforms.

The technique illustrated in FIGS. 6A and 6B also uses shared version number 402 and shared busy flag 404 to determine whether another process is currently updating shared wrap 408. If shared version number 402 or shared busy flag 404 indicate that another process is currently updating shared wrap 408, then software counter 406 must be latched before a valid increment can be performed.

Specifically, at step 602, shared version number 402 is retrieved into a local variable for use in determining whether another process updated shared wrap 408 before the complete value of software counter 406 was retrieved. At step 604, shared busy flag 404 is tested to determine whether another process is presently attempting to update shared wrap 408 while concurrently accessing software counter 406. If another process is presently attempting to update shared wrap 408, then at step 606 a Latched Software Counter Increment routine is called in order to latch software counter 406 before attempting to increment its value. The Latched Software Counter Increment routine will be described in greater detail hereafter with reference to FIGS. 7A and 7B.

Otherwise, if another process is not presently attempting to update shared wrap 408, at step 608, shared wrap 408 is retrieved into local wrap 414 and control passes to step 610.

At step 610, a loop count is tested to determine whether the loop count is less than a maximum number of tries. If the loop count is not less than a maximum number of tries, then at step 612 Latched Software Counter Increment routine is called in order to latch software counter 406 before attempting to increment its value. Otherwise, if the loop count is less than the maximum number of tries, then at step 614, shared base 410 is retrieved into local base 412.

At step 616, local base 412 is tested to determine whether incrementing local base 412 will cause it to roll-over. If incrementing local base 412 will cause it to roll-over, then at step 618, Latched Software Counter Increment routine is called in order to latch software counter 406 before attempting to increment its value.

Otherwise, if incrementing local base 412 will not cause it to roll-over, then at step 620 local newbase 416 is set equal to local base 412 plus one. Control then proceeds to step 622. In an alternative embodiment, at step 620 local newbase 416 is set equal to local base 412 plus N where N equals a predetermined value. Control then proceeds to step 622.

At step 622, in an atomic operation, shared base 410 is compared to local base 412 and, if the shared base 410 matches the local base 412, the shared base 410 is set equal to the value of local newbase 416. Control then proceeds to step 626. Otherwise, if at step 622 the shared base 410 and local base 412 do not match, then at step 624 the loop counter is incremented and control is returned to step 610.

At step 626, shared version number 402 is tested to determine whether another process could have updated shared wrap 408 while concurrently accessing software counter 406. If another process updated shared version number 402 while concurrently accessing software counter 406, then at step 628 Latched Software Counter Increment routine is called in order to latch software counter 406 before attempting to increment its value. In an alternative embodiment, a predetermined maximum iteration number is established. If another process updated shared version number 402 while concurrently accessing software counter 406, then control returns to step 602 as long as the predetermined maximum iteration number has not been exceeded.

If no other process updated shared wrap 408 while concurrently accessing software counter 406, then at step 630 local base 412 and local wrap 414 contain values that represent a valid incremented timestamp that can be safely assigned to an event.

LATCHED SOFTWARE COUNTER INCREMENT

Figure 7A:
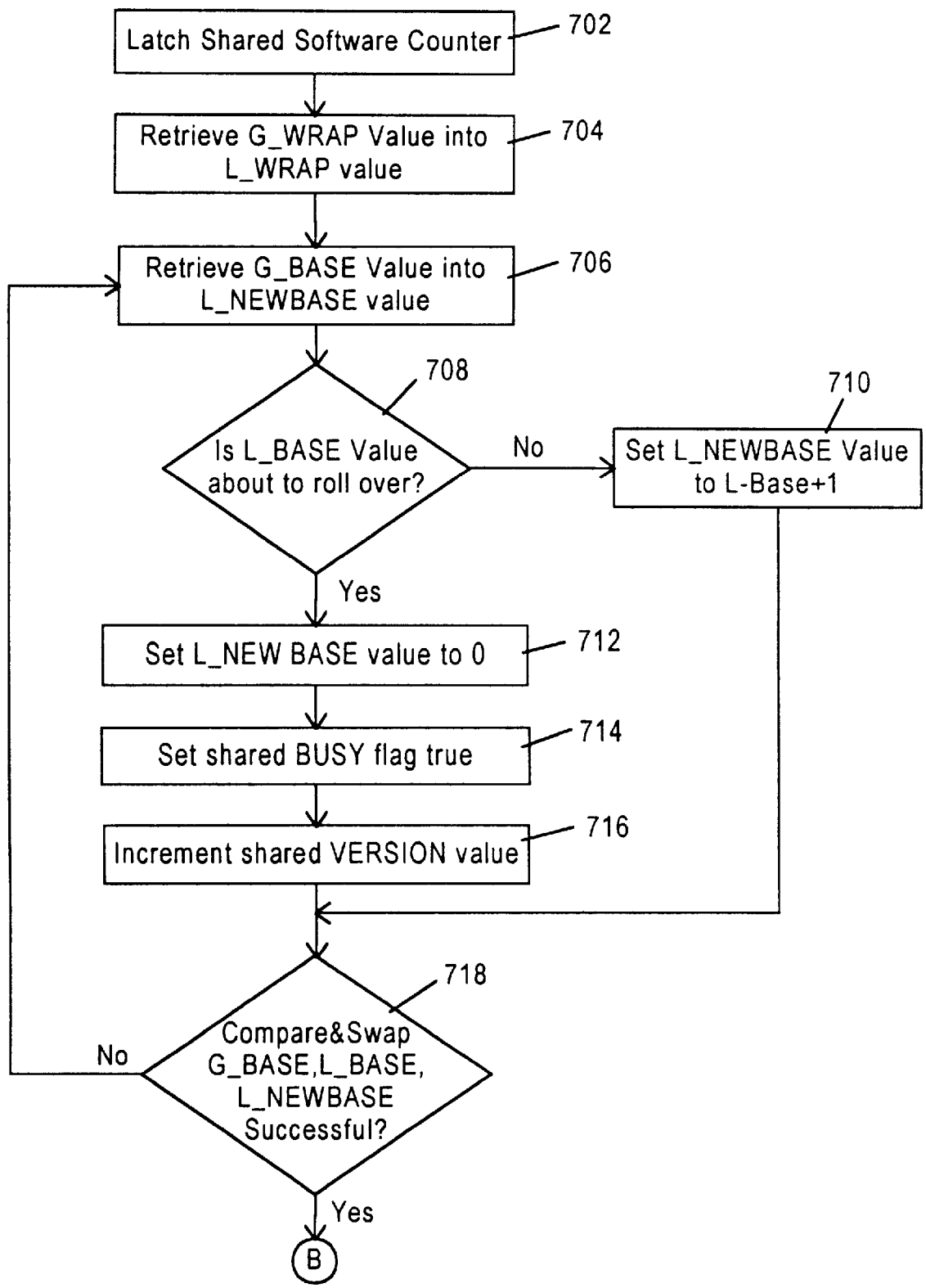
FIGS. 7A & 7B are flow diagrams illustrating steps performed in a latched increment of a software counter according to an embodiment of the invention.
Figure 7B:
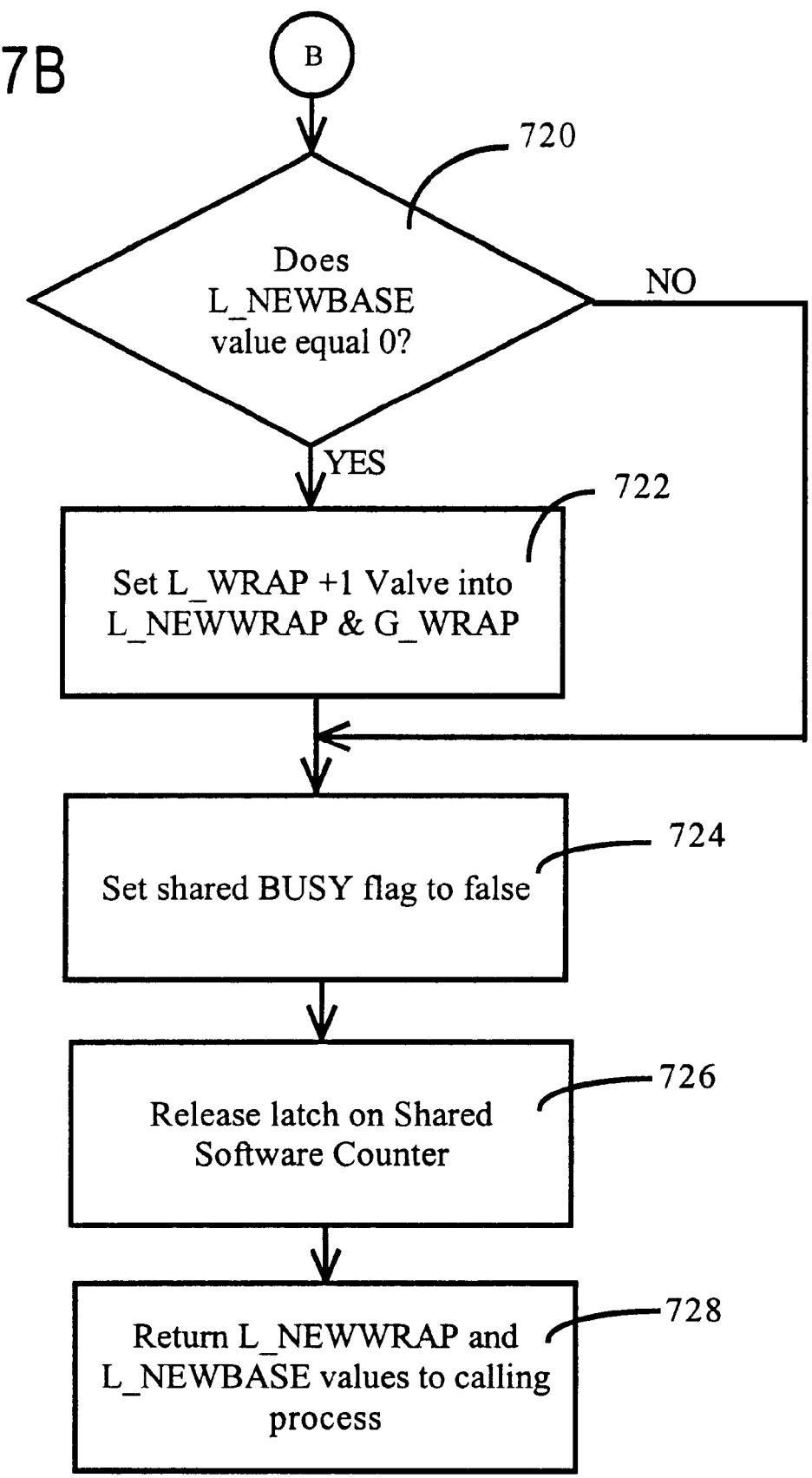

FIGS. 7A and 7B are a flow diagram that illustrate a technique for incrementing software counter 406 using a latch in order to obtain a valid timestamp value according to one embodiment of the invention. As depicted in FIGS. 7A and 7B, the latched software counter increment routine employs a latch to deny other processes concurrent access to software counter 406. The latch protects shared wrap 408, shared version number 402 and shared busy flag 404 from being modified by other processes. Shared version number 402 and shared busy flag 404 are updated to notify other processes that software counter 406 is presently being modified and therefore values currently contained in software counter 406 are not necessarily valid. The technique illustrated in FIGS. 7A and 7B assume the availability of an atomic compare and swap operation, as described above.

Referring to FIG. 7A, at step 702, software counter 406 is latched to ensure that no other process tries to update the value of shared wrap 408 concurrently. At step 704 shared wrap 408 is retrieved into local wrap 414. At step 706, shared base 410 is retrieved into local base 412. At step 708, local base 412 is tested to determine whether it has reached its maximum value and would therefore roll over to zero if incremented. If local base 412 has not reached its maximum value, then at step 710 local newbase 416 is set equal to local base 412 plus one. Control then proceeds to step 718. In an alternative embodiment, at step 710 local newbase 416 is set equal to local base 412 plus N where N equals a predetermined value. Control then proceeds to step 718.

If, at step 708, the local base 412 has reached its maximum value, then at step 712 local newbase 416 is set to zero. At step 714, shared busy flag 404 is set to true indicate that shared wrap 408 requires an update and to signal other processes that a latch must be obtained before they can access software counter 406. At step 716, shared version number 402 is incremented to signal to other processes that it is not safe to access software counter 406.

At step 718, in an atomic operation, shared base 410 is compared to local base 412. If the shared base 410 is equal to the local base, then shared base 410 is set equal to local newbase 416. Control then proceeds to step 720. Otherwise, if at step 718 the atomic compare and swap operation fails, then control proceeds to step 706 to retry the sequence.

It should be noted that shared version number 402 is only advanced when shared wrap 408 is updated. This ensures that the current process reading the software counter only needs to retry the sequence when shared wrap 408 is updated, which in this example happens very rarely. In addition, it should be noted that the order of setting the shared busy flag 404 and incrementing the shared version number 402 is important and must be followed in the described order to guarantee correctness.

At step 720, local newbase 418 is compared to zero in order to determine whether shared wrap 408 needs to be updated. If local newbase 418 is determined to be equal to zero, then at step 722, shared wrap 408 and local newwrap 418 are updated by setting them equal to the value of local wrap 414 plus one.

At step 724 shared busy flag 404 is set to false to indicate that other processes may now safely access software counter 406. Setting shared busy flag 404 false has no effect if it was not previously set to true. At step 726, the latch on software counter 406 is released to allow other processes access to software counter 406.

At step 728, local newwrap 418 and local newbase 416 contain values that represent a valid timestamp that can be attached to an event.

LATCH-FREE SOFTWARE COUNTER ADJUSTMENT

Figure 8A:
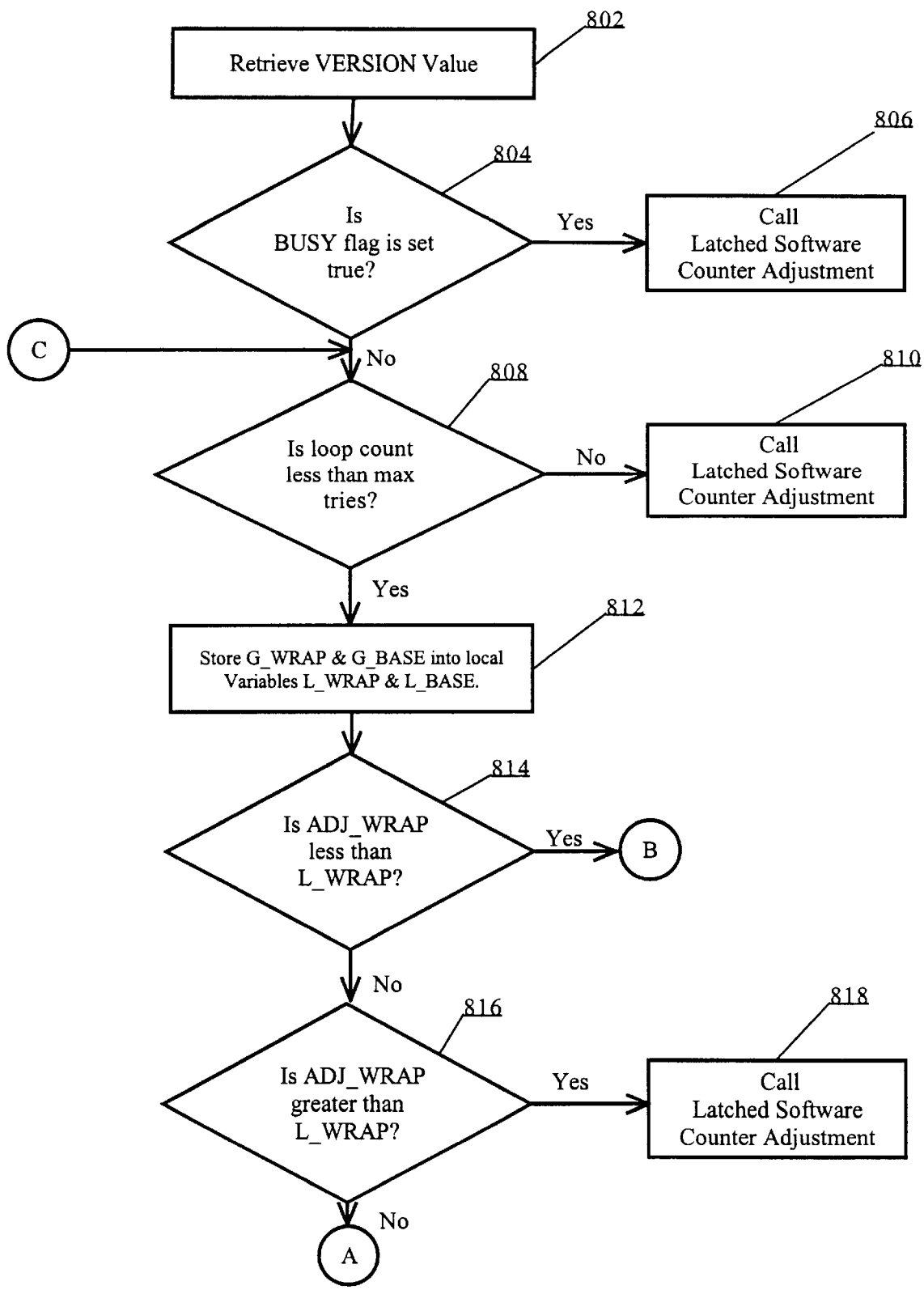
FIGS. 8A, 8B & 8C are flow diagrams illustrating steps performed in a latch-free update of a software counter according to an embodiment of the invention.
Figure 8B:
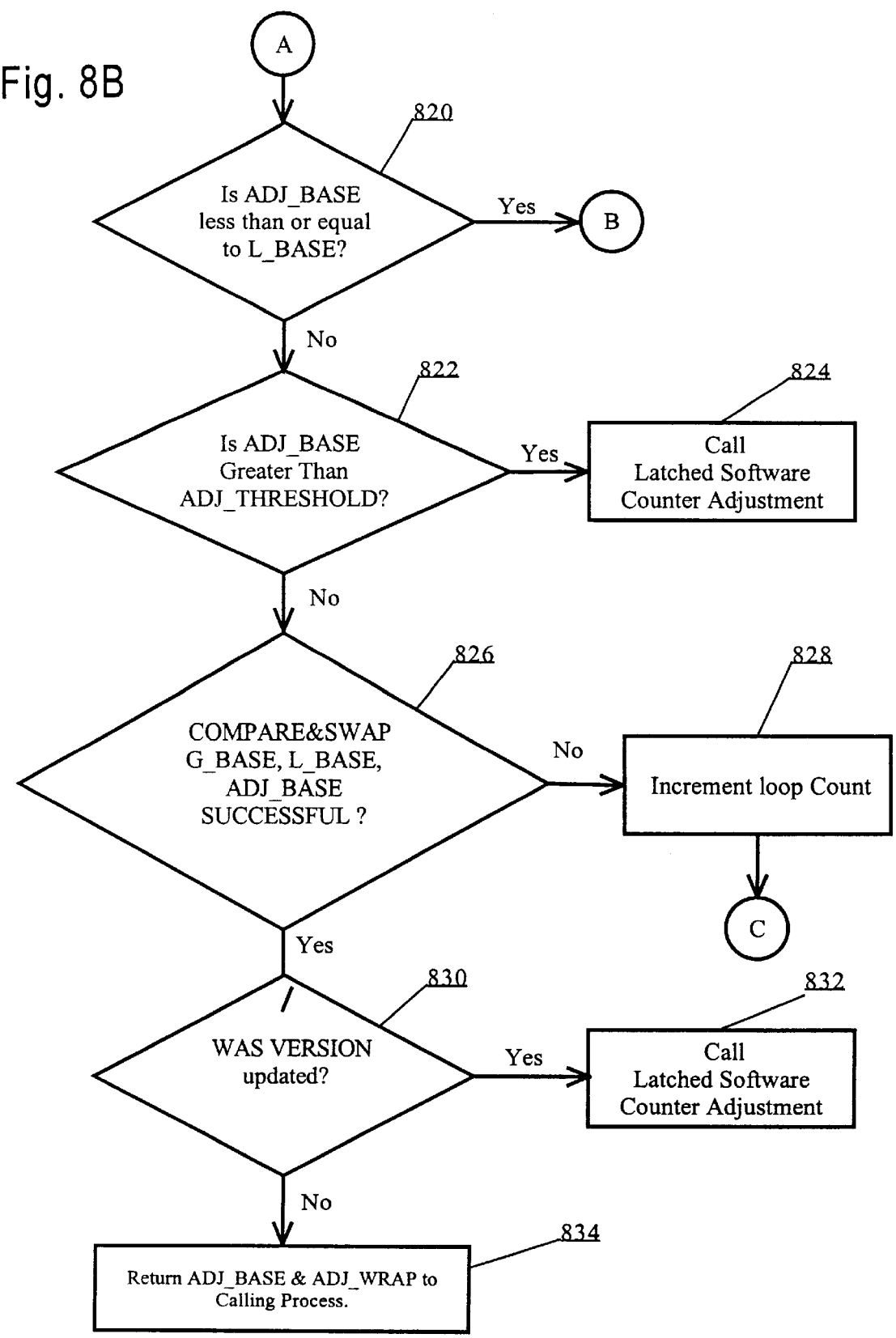
Figure 8C:
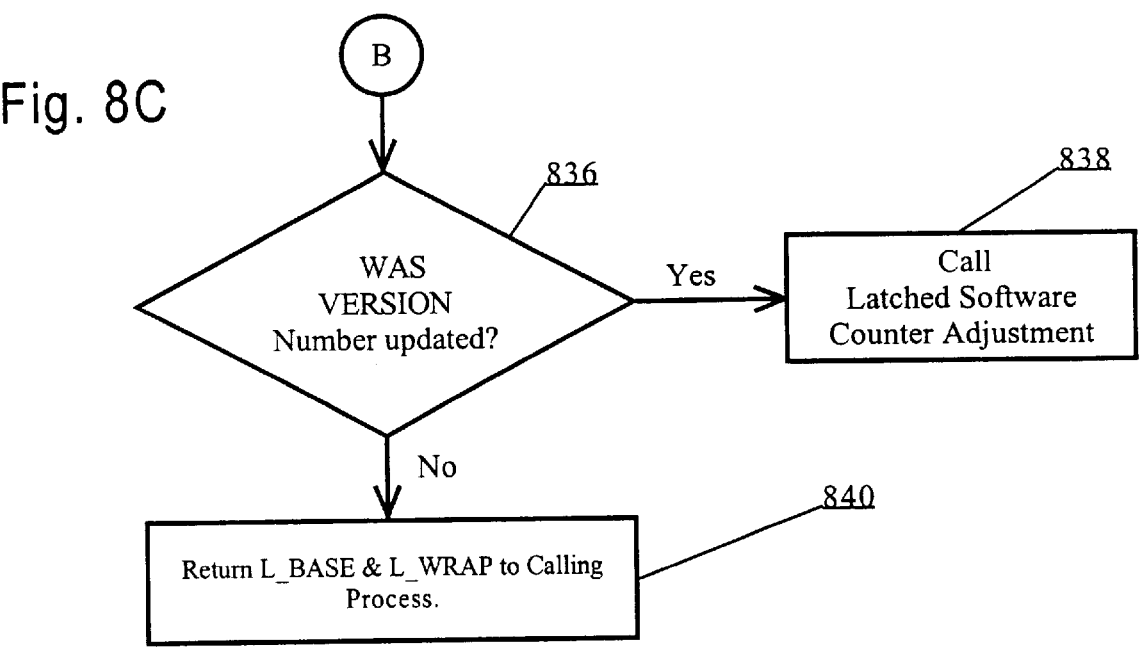

FIGS. 8A, 8B and 8C are a flow diagram illustrating a latch-free adjustment routine for adjusting software counter 406 to a value that is at least as large a specific adjust value according to one embodiment of the present invention. Local adjust variable 424 represents the requested adjustment value and is comprised of adjust base 420 and adjust wrap 422.

In the technique depicted in FIGS. 8A, 8B and 8C for determining whether a valid adjustment value can be retrieved from software counter 406 without a latch, support for an atomic compare and swap operation is assumed. According to the technique, a shared version number 402 and shared busy flag 404 are used to indicate whether another process is currently updating shared wrap 408. If shared version number 402 or shared busy flag 404 indicate that another process is currently updating shared wrap 408, then software counter 406 is latched before a valid adjustment to software counter 406 can be performed.

In one embodiment, the latch-free software counter adjustment routine attempts to perform a latch-free adjustment by (1) adjusting the value of shared wrap 408 if necessary, (2) adjusting the value of shared base 410 if necessary and then (3) determining whether the value of shared wrap 408 could have been changed by another process during the time period that elapsed between adjusting the value of shared wrap 408 and adjusting the value of shared base 410.

If the value of shared wrap 408 could not have been changed by another process during the time period that elapsed between adjusting the value of shared wrap 408 and adjusting the value of shared base 410, then the incremented value retrieved from software counter 406 is considered valid. Otherwise, a Latched Software Counter Adjustment routine is called in order to latch software counter 406 before attempting to adjust its value. The Latched Software Counter Adjustment routine will be described in greater detail hereafter with reference to FIGS. 9A, 9B and 9C.

At step 802, shared version number 402 is retrieved into a local variable for use in determining whether another process updated shared wrap 408 before the complete value of software counter 406 was advanced and retrieved. At step 804, shared busy flag 404 is tested to determine whether another process is presently attempting to update shared wrap 408 while concurrently accessing software counter 406. If another process is presently attempting to update shared wrap 408, then at step 806 Latch Software Counter Adjustment routine is called in order to latch software counter 406 before attempting to adjust its value.

Otherwise, if another process is not presently attempting to update shared wrap 408, a loop count is tested to determine whether the loop count is less than a maximum number of tries. If the loop count is not less than a maximum number of tries, then at step 810 Latch Software Counter Adjustment routine is called in order to latch software counter 406 before attempting to adjust its value. Otherwise, if the loop count is less than a maximum number of tries, then at step 812 the current value of software counter 406 is stored in local variables by setting local base 412 value equal to the current shared base 410 value and local wrap 414 value equal to the current shared wrap 408 value.

At step 814, the local adjust wrap 422 value is compared with local wrap 414 value to determine whether the requested adjust wrap value (local adjust wrap 422 value) does not require an increase to shared wrap 408. If the requested adjust wrap value (local adjust wrap 422 value) does not require an increase to shared wrap 408, then control proceeds to step 836. Otherwise, control proceeds to step 816.

At step 816, the local adjust wrap 422 value is compared with local wrap 414 value to determine whether the requested adjust wrap value (local adjust wrap 422 value) requires shared wrap 408 to be increased. If the requested adjust wrap value (local adjust wrap 422 value) requires shared wrap 408 to be increased, then at step 818 the Latch Software Counter Adjustment routine is called in order to latch software counter 406 before attempting to adjust its value.

Otherwise, at step 820, requested local adjust base 420 value is compared with local base 412 value to determine whether the requested adjust base value (local adjust base 420 value) requires shared base 410 to be increased. If the requested adjust base value (local adjust base 420 value) does not require shared base 410 to be increased, then control proceeds to step 836. Otherwise control proceeds to step 822.

At step 822, local adjust base 420 value is compared with an increment threshold value. If local adjust base 420 value is greater than the increment threshold value, then at step 824 Latch Software Counter Adjustment routine is called in order to latch software counter 406 before attempting to adjust the value of the software counter 406. If local adjust base 420 value is not greater than the increment threshold value, then control proceeds to step 826. This step ensures that large chunks of software counter values are not wasted if, in the rare case, the process is required to retry the sequence.

At step 826, in an atomic operation, shared base 410 is compared to local base 412 to determine whether another process is concurrently updating shared base 410 and if not, shared base 410 is set equal to the value of local adjust base 420. Control then proceeds to step 830. Otherwise, if at step 826 another process is concurrently updating shared base 410, then control proceeds to step 828. At step 828 the loop counter is incremented and control returns to step 808.

At step 830, shared version number 402 is tested to determine whether another process could have updated shared wrap 408 while concurrently accessing software counter 406. If another process updated shared version number 402 while concurrently updating shared wrap 408, then at step 832 Latch Software Counter Adjustment routine is called in order to latch software counter 406 before attempting to adjust its value. In an alternative embodiment, if another process updated shared wrap 408 while concurrently accessing software counter 406, then control returns to step 802 if a predetermined maximum iteration number has not been exceeded.

If no other process could have updated shared wrap 408 while concurrently accessing software counter 406, then at step 834 local adjust base 420 and local adjust wrap 422 contain values that represent a valid adjusted timestamp that can be safely attached to an event.

At step 836, shared version number 402 is tested to determine whether another process could have updated shared wrap 408 while concurrently accessing software counter 406. If another process updated shared version number 402 while concurrently updating shared wrap 408, then at step 838 Latch Software Counter Adjustment routine is called in order to latch software counter 406 before attempting to adjust its value. Otherwise, if no other process could have updated shared wrap 408 while concurrently accessing software counter 406, then at step 840 local base 412 and local wrap 414 contain values that represent a valid adjusted timestamp that can be safely attached to an event.

LATCHED SOFTWARE COUNTER ADJUSTMENT

Figure 9A:
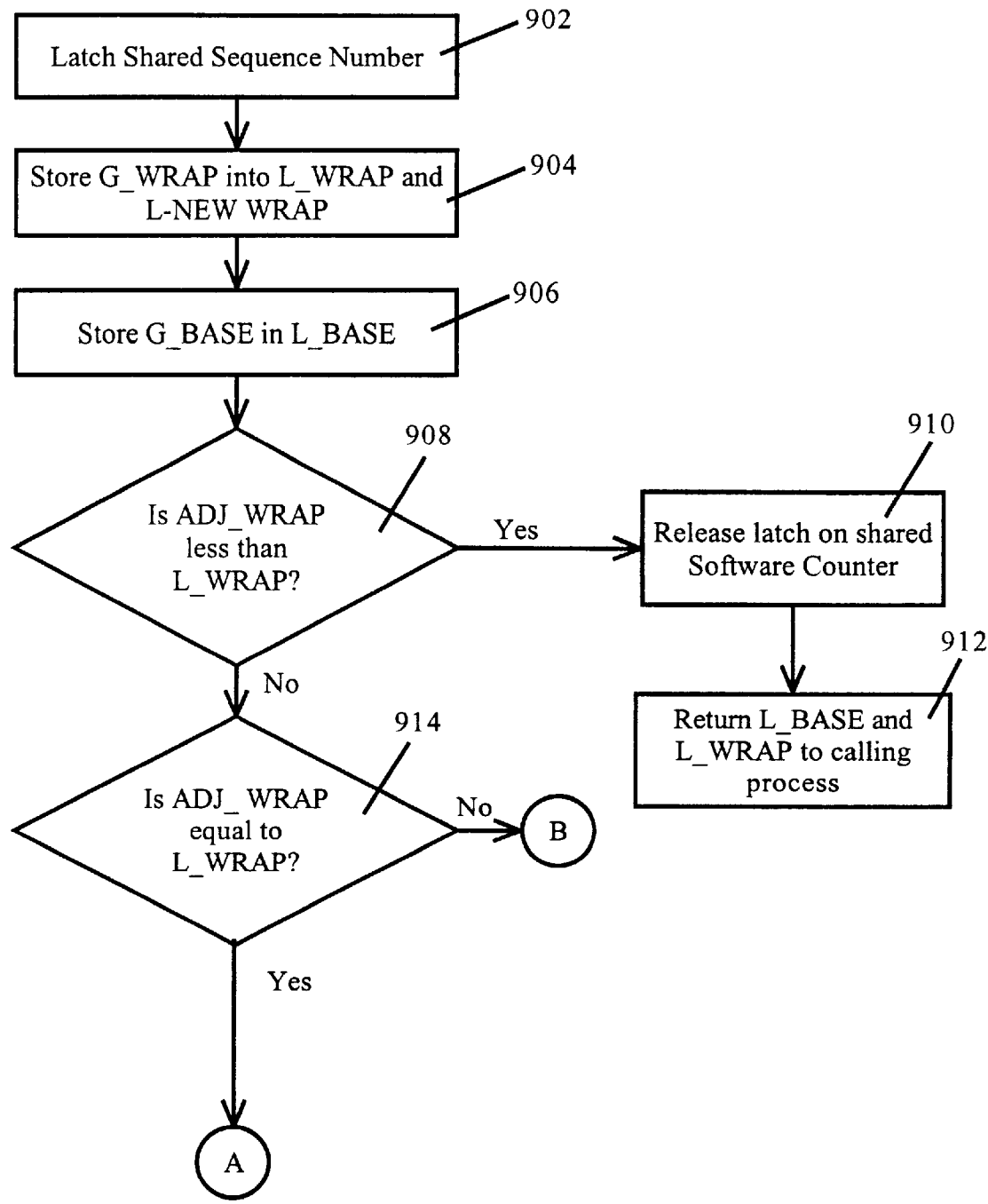
FIGS. 9A, 9B & 9C are flow diagrams illustrating steps performed in a latched update of a software counter according to an embodiment of the invention.
Figure 9B:
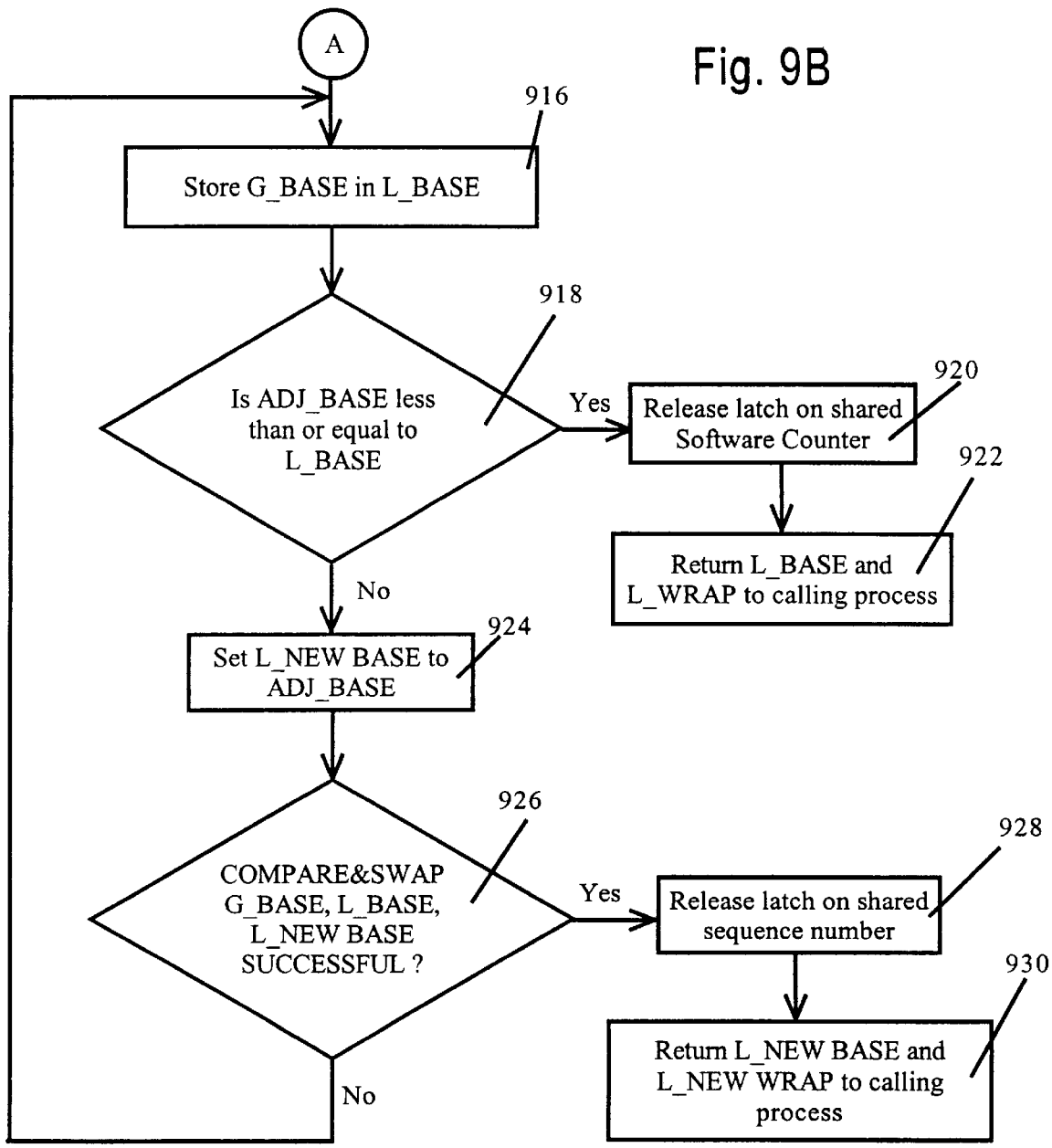
Figure 9C:
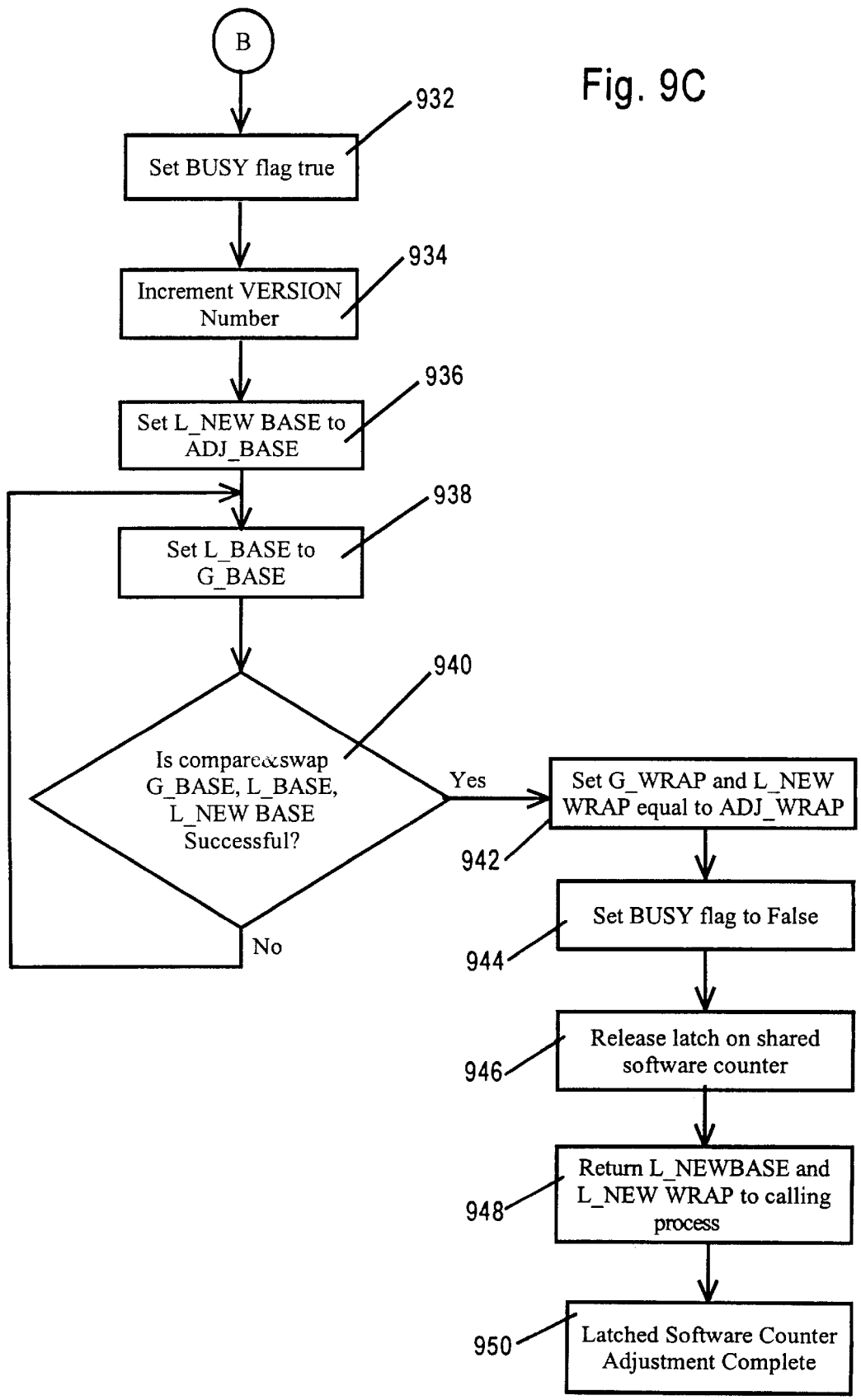

FIGS. 9A, 9B and 9C are a flow diagram that illustrate a technique for adjusting software counter 406 after obtaining a latch. As depicted in FIGS. 9A, 9B and 9C, the latched software counter adjustment routine uses a latch to deny other processes concurrent access to software counter 406. Shared version number 402 and shared busy flag 404 are updated to notify other processes that shared wrap 408 is presently being modified and that therefore any values retrieved from software counter 406 are not necessarily valid. The technique illustrated in FIGS. 9A, 9B and 9C assume the availability of an atomic compare and swap operation.

Referring to FIG. 9A, at step 902, software counter 406 is latched to ensure that no other process tries to update software counter 406 concurrently. At step 904 shared wrap 408 is retrieved into local wrap 414 and local newwrap 418. At step 906, shared base 410 is retrieved into local base 412.

At step 908, requested local adjust wrap 422 value is compared with local wrap 414 value to determine whether the requested software counter adjustment 424 value is less than the current value of software counter 406. If the requested software counter adjustment 424 value is less than the current value of software counter 406, then no adjustment is required on software counter 406 and control proceeds to step 910. Otherwise, control then proceeds to step 914.

At step 910, the latch on software counter 406 is released to allow other processes access to software counter 406. At step 912, local base 412 and local wrap 414 contain values that represent a valid adjusted timestamp that can be safely attached to an event.

At step 914, requested local adjust wrap 422 value is compared with local wrap 414 value to determine whether the requested software counter adjustment 424 value is shared wrap 408 definitely needs to be increased. If shared wrap 408 definitely needs to be increased, then control proceeds to step 932. Otherwise, control proceeds to step 916 in order to determine whether shared base 410 needs to be increased.

At step 916, shared base 410 is retrieved into local base 412. At step 918 requested local adjust base 420 value is compared with local base 412 value to determine whether the requested adjust base value (local adjust base 420 value) requires shared base 410 to be increased. If the adjust base value (local adjust base 420 value) does not requires shared base 410 to be increased, the control proceeds to step 920. Otherwise control then proceeds to step 924.

At 920, the latch on software counter 406 is released to allow other processes access to software counter 406. At step 922, local base 412 and local wrap 414 contain values that represent a valid adjusted timestamp that can be safely attached to an event.

At step 924, the value of local newbase 416 is set equal to the value of local adjust base 420. At step 926, in an atomic operation, shared base 410 is compared to local base 412 to determine whether another process has updated shared base 410 and if not, shared base 410 is set equal to the value of local newbase 416. Control then proceeds to step 928. Otherwise, if at step 926 the atomic operation determines that another process is concurrently updating shared base 410, then control returns to step 916.

At step 928, the latch on software counter 406 is released to allow other processes access to software counter 406. At step 930, local newbase 416 and local newwrap 418 contain values that represent a valid adjusted timestamp that can be safely attached to an event.

At step 932, shared busy flag 404 is set true to indicate that shared wrap 408 requires an update and to signal to other processes that a latch must be obtained before they can access software counter 406. At step 934, shared version number 402 is incremented to signal to other processes that it is not safe to access software counter 406. At step 936, the value of local newbase 416 is set equal to the value of local adjust base 420.

At step 938, shared base 410 is retrieved into local base 412. At step 940, in an atomic operation, shared base 410 is compared to local base 412 to determine whether another process has concurrently updated shared base 410 and if not, shared base 410 is set equal to the value of local newbase 416. Control then proceeds to step 942. Otherwise, if at step 926 the atomic operation determines that another process has concurrently updated shared base 410, control then returns to step 938.

At step 942, shared wrap 408 and local newwrap 418 are set equal to the value of local adjust wrap 422. At step 944, shared busy flag 404 is set to false to indicate that other processes may now safely access software counter 406. At step 946, the latch on software counter 406 is released to allow other processes access to software counter 406. At step 948, local newbase 416 and local newwrap 418 contain values that represent a valid adjusted timestamp that can be safely attached to an event.

In the above examples, shared base 410 is depicted as being comprised of a single machine word. However, in certain embodiments, shared base 410 is not restricted by the machine word size. Instead, shared base 410 is restricted by the size of variables that the particular system can be atomically compare-and-swap in a single machine operation. Thus, where the atomic compare-and-swap operation is capable of functioning across N number of machine words, shared base 410 can be comprised of up to N number of machine words. For example, if the atomic compare-and-swap operation can atomically compare-and-swap variables comprised of three machine words, then shared base 410 can be comprised of up to three machine words.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for reading a software counter in a computer system, wherein a plurality of processes have access to said software counter, wherein said software counter includes a wrap portion and a base portion that cannot both be accessed in an atomic operation, the method comprising the steps of:

reading a first value, said first value being one of said wrap portion and said base portion;

reading a second value, said second value being the other of said wrap portion and said base portion;

determining whether said first value was changed during a time period that elapsed between reading said first value and reading said second value;

if said first value was changed during said time period, then obtaining a latch that covers at least said wrap portion;

reading said wrap portion;

reading said base portion; and releasing said latch.

2. The method of claim 1, wherein:

the step of reading a first value is performed by reading said wrap portion;

the step of reading a second value is performed by reading said base portion.

3. The method of claim 1, wherein the step of determining whether said first value was changed includes the step of accessing a first flag, wherein said first flag indicates whether said wrap portion may have changed after reading said wrap portion and before reading said base portion.

4. The method of claim 1, wherein the step of determining whether said first value was changed includes the step of accessing a version number, wherein said version number indicates whether said wrap portion may have changed after reading said wrap portion and before reading said base portion.

5. A method for increasing a sequence number stored in a software counter in a computer system, wherein a plurality of processes have access to said software counter, wherein said software counter includes a wrap portion and a base portion that cannot both be accessed in an atomic operation, the method comprising the steps of:

determining whether an increase to said software counter requires a change to said wrap portion;

if an increase to said software counter requires a change to said wrap portion, then obtaining a latch that covers at least said wrap portion; and updating said software counter after obtaining said latch;

if an increase to said software counter does not require a change to said wrap portion, then reading a first base value from said base portion;

in an atomic operation, performing the steps of reading a second base value from said base portion;

comparing said first base value with said second base value;

if said first base value is equal to said second base value, then storing a third base value in said base portion, wherein said third base value is greater than said first base value.

6. The method of claim 5, further comprising the steps of:

if said first base value is not equal to said second base value, then obtaining a latch that covers at least said wrap portion; and updating said software counter after obtaining said latch.

7. The method of claim 6, wherein the steps of updating said software counter after obtaining said latch include the steps of:

A) reading a fourth base value from said base portion;

B) in an atomic operation, performing the steps of reading a fifth base value from said base portion;

comparing said fourth base value with said fifth base value;

if said fourth base value is equal to said fifth base value, then storing an increased fourth base value in said base portion;

C) if an increase to said software counter requires a change to said wrap portion, then storing an increased wrap value in said wrap portion.

8. The method of claim 7, wherein the step of determining whether an increase to said software counter requires a change to said wrap portion includes the steps of:

reading said first base value from said base portion;

reading said second base value from said target base portion;

storing said third base value wherein said third base portion equals the difference between said first base value and said second base value;

comparing said third base value with a threshold value wherein said threshold value is equal to a desired maximum increase in said base portion.

9. The method of claim 7, wherein the step of determining whether an increase to said software counter requires a change to said wrap portion includes the steps of:

reading a first wrap value from said wrap portion;

reading a second wrap value from said target wrap portion;

comparing said first wrap value to said second wrap value.

10. The method of claim 7, further comprising the step of if said fourth base value is not equal to said fifth base value, then repeating steps (A) through (B) until a desired number of iterations is completed.

11. The method of claim 5, further comprising the step of receiving a target sequence number that indicates a minimum value to which the software counter must be set, wherein said target sequence number includes a target base portion and a target wrap portion.

12. The method of claim 11, wherein the step of updating said software counter after obtaining a latch includes the steps of:

determining whether setting said software counter to a value at least as high as said target sequence number requires a change to said wrap portion;

if setting said software counter to a value at least as high as said target sequence number requires a change to said wrap portion, then reading said first base value from said target base portion;

in an atomic operation, performing the steps of reading said second base value from said base portion;

comparing said first base value with said second base value;

if said first base value is equal to said second base value, then storing said first base value in said base portion;

storing said target wrap portion in said wrap portion;

if setting said software counter to a value at least as high as said target sequence number does not require a change to said wrap portion, then determining whether an increase to said software counter requires a change to said base portion;

if an increase to said software counter requires a change to said base portion, then reading said first base value from said target base portion;

in an atomic operation, performing the steps of reading said second base value from said base portion;

comparing said first base value with said second base value;

if said first base value is equal to said second base value, then storing said first base value in said base portion.

13. The method of claim 5, wherein the step of reading a first base value from said base portion further includes the steps of:

determining whether an increase to said software requires a change to said base portion; and performing an atomic operation only if an increase to said software requires a change to said base portion.

14. The method of claim 5, wherein the step of determining whether an increase to said software counter requires a change to said wrap portion includes the step of accessing a first flag, wherein said first flag indicates whether said wrap portion may have changed after reading said wrap portion and before reading said base portion.

15. The method of claim 5, wherein the step of determining whether an increase to said software counter requires a change to said wrap portion includes the step of accessing a version number, wherein said version number indicates whether said wrap portion may have changed after reading said wrap portion and before reading said base portion.

16. The method of claim 5 wherein the step of determining whether an increase to said software counter requires a change to said wrap portion includes the steps of:

reading said first base value from said base portion;

determining whether first base value is equal to a rollover value, wherein said rollover value equals a maximum value that said base portion may represent.

17. The method of claim 5, wherein the step of determining whether an increase to said software counter requires a change to said wrap portion includes the steps of:
  A) reading said wrap portion;
  B) reading said first base value from said base portion;
  C) determining whether said first base value is equal to a rollover value, wherein said rollover value equals a maximum value that said base portion may represent;
  D) if said first base value does not equals said rollover value, then in an atomic operation, performing the steps of
    reading said second base value from said base portion;
    comparing said first base value with said second base value;
    if said first base value is equal to said second base value, then
      storing an increased said first base value in said base portion;
      determining whether said wrap portion changed after reading said wrap portion and before storing an increased first base value in said base portion.

18. The method of claim 17, further comprising the step of repeating steps (B) through (D) until a desired number of iterations is completed.

19. A computer-readable medium carrying one or more sequences of one or more instructions for reading a software counter in a computer system, wherein a plurality of processes have access to said software counter, wherein said software counter includes a wrap portion and a base portion that cannot both be accessed in an atomic operation, wherein the execution of the one or more sequences of one or more instructions by one or more processors causes the one or more processors to perform the steps of:
  reading a first value, said first value being one of said wrap portion and said base portion;
  reading a second value, said second value being the other of said wrap portion and said base portion;
  determining whether said first value was changed during a time period that elapsed between reading said first value and reading said second value;
  if said first value was changed during said time period, then
    obtaining a latch that covers at least said wrap portion;
    reading said wrap portion;
    reading said base portion; and
    releasing said latch.

20. The computer-readable medium of claim 19, wherein:
  the step of reading a first value is performed by reading said wrap portion;
  the step of reading a second value is performed by reading said base portion.

21. The computer-readable medium of claim 19, wherein the step of determining whether said first value was changed includes the step of accessing a first flag, wherein said first flag indicates whether said wrap portion may have changed after reading said wrap portion and before reading said base portion.

22. The computer-readable medium of claim 19, wherein the step of determining whether said first value was changed includes the step of accessing a version number, wherein said version number indicates whether said wrap portion may have changed after reading said wrap portion and before reading said base portion.

23. A computer-readable medium carrying one or more sequences of one or more instructions for increasing a sequence number stored in a software counter in a computer system, wherein a plurality of processes have access to said software counter, wherein said software counter includes a wrap portion and a base portion that cannot both be accessed in an atomic operation, wherein the execution of the one or more sequences of one or more instructions by one or more processors causes the one or more processors to perform the steps of:
  determining whether an increase to said software counter requires a change to said wrap portion;
  if an increase to said software counter requires a change to said wrap portion, then
    obtaining a latch that covers at least said wrap portion; and
    updating said software counter after obtaining said latch;
  if an increase to said software counter does not require a change to said wrap portion, then
    reading a first base value from said base portion;
    in an atomic operation, performing the steps of
      reading a second base value from said base portion;
      comparing said first base value with said second base value;
      if said first base value is equal to said second base value, then storing a third base value in said base portion, wherein said third base value is greater than said first base value.

24. The computer-readable medium of claim 23, wherein the computer-readable medium further comprises instructions for performing the step of:
  if said first base value is not equal to said second base value, then
    obtaining a latch that covers at least said wrap portion; and
    updating said software counter after obtaining said latch.

25. The computer-readable medium of claim 24, wherein the steps of updating said software counter after obtaining said latch include the steps of:
  A) reading a fourth base value from said base portion;
  B) in an atomic operation, performing the steps of
    reading a fifth base value from said base portion;
    comparing said fourth base value with said fifth base value;
    if said fourth base value is equal to said fifth base value, then storing an increased fourth base value in said base portion;
  C) if an increase to said software counter requires a change to said wrap portion, then
    storing an increased wrap value in said wrap portion.

26. The computer-readable medium of claim 25, wherein the step of determining whether an increase to said software counter requires a change to said wrap portion includes the steps of:
  reading said first base value from said base portion;
  reading said second base value from said target base portion;
  storing said third base value wherein said third base portion equals the difference between said first base value and said second base value;
  comparing said third base value with a threshold value wherein said threshold value is equal to a desired maximum increase in said base portion.

27. The computer-readable medium of claim 25, wherein the step of determining whether an increase to said software counter requires a change to said wrap portion includes the steps of:
  reading a first wrap value from said wrap portion;
  reading a second wrap value from said target wrap portion;
  comparing said first wrap value to said second wrap value.

28. The computer-readable medium of claim 25, wherein the computer-readable medium further comprises instructions for performing the step of
  if said fourth base value is not equal to said fifth base value, then repeating steps (A) through (B) until a desired number of iterations is completed.

29. The computer-readable medium of claim 23, wherein the computer-readable medium further comprises instructions for performing the step of receiving a target sequence number that indicates a minimum value to which the software counter must be set, wherein said target sequence number includes a target base portion and a target wrap portion.

30. The computer-readable medium of claim 29, wherein the step of updating said software counter after obtaining a latch includes the steps of:
  determining whether setting said software counter to a value at least as high as said target sequence number requires a change to said wrap portion;
  if setting said software counter to a value at least has high as said target sequence number requires a change to said wrap portion, then
    reading said first base value from said target base portion;
    in an atomic operation, performing the steps of
      reading said second base value from said base portion;
      comparing said first base value with said second base value;
      if said first base value is equal to said second base value, then storing said first base value in said base portion;
    storing said target wrap portion in said wrap portion,
  if setting said software counter to a value at least has high as said target sequence number does not require a change to said wrap portion, then
    determining whether an increase to said software counter requires a change to said base portion;
    if an increase to said software counter requires a change to said base portion, then
      reading said first base value from said target base portion;
      in an atomic operation, performing the steps of
        reading said second base value from said base portion;
        comparing said first base value with said second base value;
        if said first base value is equal to said second base value, then storing said first base value in said base portion.

31. The computer-readable medium of claim 23, wherein the step of reading a first base value from said base portion further comprises instructions for performing the steps of:
  determining whether an increase to said software requires a change to said base portion; and
  performing an atomic operation only if an increase to said software requires a change to said base portion.

32. The computer-readable medium of claim 23, wherein the step of determining whether an increase to said software counter requires a change to said wrap portion includes the step of accessing a first flag, wherein said first flag indicates whether said wrap portion may have changed after reading said wrap portion and before reading said base portion.

33. The computer-readable medium of claim 23, wherein the step of determining whether an increase to said software counter requires a change to said wrap portion includes the step of accessing a version number, wherein said version number indicates whether said wrap portion may have changed after reading said wrap portion and before reading said base portion.

34. The computer-readable medium of claim 23, wherein the step of determining whether an increase to said software counter requires a change to said wrap portion includes the steps of:
  reading said first base value from said base portion;
  determining whether first base value is equal to a rollover value, wherein said rollover value equals a maximum value that said base portion may represent.

35. The computer-readable medium of claim 23, wherein the step of determining whether an increase to said software counter requires a change to said wrap portion includes the steps of:
  A) reading said wrap portion;
  B) reading said first base value from said base portion;
  C) determining whether said first base value is equal to a rollover value, wherein said rollover value equals a maximum value that said base portion may represent;
  D) if said first base value does not equals said rollover value, then in an atomic operation, performing the steps of
    reading said second base value from said base portion;
    comparing said first base value with said second base value;
    if said first base value is equal to said second base value, then
      storing an increased said first base value in said base portion;
      determining whether said wrap portion changed after reading said wrap portion and before storing an increased first base value in said base portion.

36. The computer-readable medium of claim 35, wherein the computer-readable medium further comprises instructions for performing the step of repeating steps (B) through (D) until a desired number of iterations is completed.

37. A computer system for reading a software counter in a computer system, wherein a plurality of processes have access to said software counter, wherein said software counter includes a wrap portion and a base portion that cannot both be accessed in an atomic operation, the system comprising:
  a memory;
  one or more processors coupled to the memory; and
  a set of computer instructions contained in the memory, the set of computer instructions including computer instructions which when executed by the one or more processors, cause the one or more processors to perform the steps of:
    reading a first value, said first value being one of said wrap portion and said base portion;
    reading a second value, said second value being the other of said wrap portion and said base portion;
    determining whether said first value was changed during a time period that elapsed between reading said first value and reading said second value;
    if said first value was changed during said time period, then obtaining a latch that covers at least said wrap portion;
reading said wrap portion;
reading said base portion; and
releasing said latch.

38. The computer system of claim 37, wherein:
the step of reading a first value is performed by reading said wrap portion;
the step of reading a second value is performed by reading said base portion.

39. A computer system for increasing a sequence number stored in a software counter in a computer system, wherein a plurality of processes have access to said software counter, wherein said software counter includes a wrap portion and a base portion that cannot both be accessed in an atomic operation, the computer system comprising:
a memory;
one or more processors coupled to the memory; and
a set of computer instructions contained in the memory, the set of computer instructions including computer instructions which when executed by the one or more processors, cause the one or more processors to perform the steps of:
determining whether an increase to said software counter requires a change to said wrap portion;
if an increase to said software counter requires a change to said wrap portion, then
obtaining a latch that covers at least said wrap portion; and
updating said software counter after obtaining said latch;
is an increase to said software counter does not require a change to said wrap portion, then
reading a first base value from said base portion;
in an atomic operation, performing the steps of
reading a second base value from said base portion;
comparing said first base value with said second base value;
if said first base value is equal to said second base value, then storing a third base value in said base portion, wherein said third base value is greater than said first base value.

40. The computer system of claim 39, wherein the set of computer instructions further comprises computer instructions for performing the steps of:
if said first base value is not equal to said second base value, then
obtaining a latch that covers at least said wrap portion; and
updating said software counter after obtaining said latch.

41. The computer system of claim 40, wherein the steps of updating said software counter after obtaining said latch include the steps of:
A) reading a fourth base value from said base portion;
B) in an atomic operation, performing the steps of
reading a fifth base value from said base portion;
comparing said fourth base value with said fifth base value;
if said fourth base value is equal to said fifth base value, then storing an increased fourth base value in said base portion;
C) if an increase to said software counter requires a change to said wrap portion, then
storing an increased wrap value in said wrap portion.

42. The computer system of claim 39, wherein the set of computer instructions further comprises computer instructions for performing the step of receiving a target sequence number that indicates a minimum value to which the software counter must be set, wherein said target sequence number includes a target base portion and a target wrap portion.

43. The computer system of claim 42, wherein the step of updating said software counter after obtaining a latch includes the steps of:
determining whether setting said software counter to a value at least as high as said target sequence number requires a change to said wrap portion;
if setting said software counter to a value at least has high as said target sequence number requires a change to said wrap portion, then
reading said first base value from said target base portion;
in an atomic operation, performing the steps of
reading said second base value from said base portion;
comparing said first base value with said second base value;
if said first base value is equal to said second base value, then storing said first base value in said base portion;
storing said target wrap portion in said wrap portion;
if setting said software counter to a value at least has high as said target sequence number does not require a change to said wrap portion, then
determining whether an increase to said software counter requires a change to said base portion;
if an increase to said software counter requires a change to said base portion, then
reading said first base value from said target base portion;
in an atomic operation, performing the steps of
reading said second base value from said base portion;
comparing said first base value with said second base value;
if said first base value is equal to said second base value, then storing said first base value in said base portion.

44. The computer system of claim 39, wherein the step of reading a first base value from said base portion further comprises computer instructions for performing the steps of:
determining whether an increase to said software requires a change to said base portion; and
performing an atomic operation only if an increase to said software requires a change to said base portion.

* * * * *